(12) United States Patent
Higley et al.

(10) Patent No.: US 12,332,486 B2
(45) Date of Patent: Jun. 17, 2025

(54) FERRULE SEATING FEATURES FOR A FIBER OPTIC CONNECTOR

(71) Applicant: US Conec Ltd., Hickory, NC (US)

(72) Inventors: Jason Higley, Hickory, NC (US); Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 178 days.

(21) Appl. No.: 17/924,316

(22) PCT Filed: May 21, 2021

(86) PCT No.: PCT/US2021/033718
§ 371 (c)(1),
(2) Date: Nov. 9, 2022

(87) PCT Pub. No.: WO2021/237127
PCT Pub. Date: Nov. 25, 2021

(65) Prior Publication Data
US 2023/0176296 A1    Jun. 8, 2023

Related U.S. Application Data

(60) Provisional application No. 63/028,238, filed on May 21, 2020.

(51) Int. Cl.
G02B 6/38 (2006.01)
(52) U.S. Cl.
CPC .................. *G02B 6/3871* (2013.01)
(58) Field of Classification Search
None
See application file for complete search history.

(56) References Cited

U.S. PATENT DOCUMENTS 5,181,267 A * 1/1993 Gerace ................. G02B 6/3869
                                                    385/86
5,588,079 A    12/1996 Tanabe et al.
(Continued)

FOREIGN PATENT DOCUMENTS

EP    2278367 A1    1/2011
EP    2548061 B1    6/2020
(Continued)

OTHER PUBLICATIONS

International Search Report, Sep. 6, 2021 3 pages in PCT/US2021/033718.
(Continued)

*Primary Examiner* — Jerry Rahll
(74) *Attorney, Agent, or Firm* — Michael L. Leetzow PLLC; Shubhrangshu Sengupta

(57) ABSTRACT

A fiber optic connector housing has seating features in an internal opening that coordinate with a flange on a fiber optic ferrule to have a secure and precise position for the fiber optic ferrule. There are at least one pair of ramps that may be attached to an inner connector housing wall and an opening wall. The flange has contacts that engage the ramps, which direct the fiber optic ferrule in a rotational direction as well as a translational direction to a final position. The seating features also ensure the correct position after the fiber optic ferrule has been mated and unmated.

18 Claims, 27 Drawing Sheets

(56) References Cited

U.S. PATENT DOCUMENTS

| | | | |
|---|---|---|---|
| 6,402,392 B1* | 6/2002 | Yarita | G02B 6/3869 385/60 |
| 6,550,979 B1* | 4/2003 | Fleenor | G02B 6/3869 385/139 |
| 6,908,233 B2 | 6/2005 | Nakajima et al. | |
| 8,419,294 B2* | 4/2013 | Hyakutake | G02B 6/3869 385/60 |
| 8,801,301 B2 | 8/2014 | Bradley et al. | |
| 9,927,581 B1 | 3/2018 | Rosson et al. | |
| 10,139,572 B2* | 11/2018 | Hopper | G02B 6/3885 |
| 10,353,154 B2 | 7/2019 | Ott et al. | |
| 10,422,963 B2* | 9/2019 | Yang | G02B 6/3849 |
| 10,641,972 B2 | 5/2020 | Wong et al. | |
| 2002/0186931 A1* | 12/2002 | Seo | G02B 6/3875 385/60 |
| 2003/0077045 A1* | 4/2003 | Fleenor | G02B 6/3869 385/86 |
| 2003/0142919 A1 | 7/2003 | Zimmel | |
| 2006/0269194 A1* | 11/2006 | Luther | G02B 6/3863 385/85 |
| 2011/0038584 A1* | 2/2011 | Hyakutake | G02B 6/3869 385/78 |
| 2016/0216458 A1* | 7/2016 | Shih | G02B 6/3879 |
| 2017/0293090 A1* | 10/2017 | Hopper | G02B 6/3885 |
| 2019/0056557 A1 | 2/2019 | Wong et al. | |
| 2019/0235182 A1* | 8/2019 | Cheng | G02B 6/3871 |
| 2020/0003963 A1* | 1/2020 | Iizumi | G02B 6/3871 |
| 2020/0103602 A1 | 4/2020 | Woodruff et al. | |
| 2021/0033796 A1 | 2/2021 | Zimmel et al. | |
| 2021/0080657 A1 | 3/2021 | Jones et al. | |

FOREIGN PATENT DOCUMENTS

| | | |
|---|---|---|
| WO | 2016073265 A1 | 5/2016 |
| WO | 2019005195 A1 | 1/2019 |
| WO | 2019131098 A1 | 7/2019 |
| WO | 2021081514 A1 | 4/2021 |

OTHER PUBLICATIONS

Written Opinion of the ISA; 5 pages; Sep. 6, 2021 in PCT/US2021/033718.

* cited by examiner

FERRULE SEATING FEATURES FOR A FIBER OPTIC CONNECTOR

REFERENCE TO RELATED CASE

This application claims priority under 35 U.S.C. § 119 (e) to U.S. provisional application No. 63/028,238, filed on May 21, 2020, the contents of which are hereby incorporated by reference in their entirety.

BACKGROUND OF THE INVENTION

Optical fibers for optical communications are typically held inside one or more fiber optic ferrules. These fiber optic ferrules may hold a single optical fiber or may have multiple optical fibers depending upon the type of fiber optical ferrule. Regardless of the type of fiber optic ferrule, the fiber optic ferrule with the optical fiber(s) therein is typically seated inside a connector housing or an adapter for mating with another fiber optic ferrule. The secure seating requirements and tolerances depend on various factors such as the type of end-face of the fiber optic ferrule (angled or flat polished), and the force experienced by a fiber optic ferrule in an unmated condition (from a biasing spring), and during mating from another fiber optic ferrule that pushes the fiber optic ferrule away from the ferrule seat (against the spring push force in the unmated condition). The losses in the optical connections are determined, in part, by how securely and precisely the fiber optic ferrule can sit and stay in a given position (mated or unmated). Some of the variables by which this position is toleranced by are planar and rotational movement tolerances for the ferrule. Further, these tolerances are stricter when an end-face of the fiber optic ferrule is angle polished (for single mode fiber applications to reduce back reflections). For example, in a flat polished end-face fiber optic ferrule, the rotational movement of the fiber optic ferrule about a longitudinal axis tolerated for an acceptable standard connection is about 8°, whereas for an angled polished enface, this tolerance should be very low, ideally 0°, or as close as possible to 0° (although, no standard industry-wide acceptable values exist). While rotation of the fiber optic ferrule is not much of a concern for flat polished fiber optic ferrules, it is a significant tolerance parameter for angled polished fiber optic ferrules. This is because the fiber optic ferrule rotation beyond a threshold will result in misalignment of the mating optical fiber tips, causing losses or even a total disruption of the optical connection. The added rotational tolerance also affects the ability to create a consistent apex offset value during polishing of the end-face, and the ability to measure the apex offset using an interferometer.

Various conventional techniques seat the ferrule inside a connector housing using different techniques. For example, U.S. Pat. No. 5,588,079 describes rotating a ferrule and a flange to automatically engage a space surrounded by flat portions inside a connector housing, until the flange on the ferrule is in contact with stopper surface of the housing against which the ferrule sits. See, e.g., FIG. 10 of the '079 patent. WIPO Publication No. WO 2016/073265 describes another example technique to guide and seat a ferrule inside the connector housing (shown having a flat polished endface) during mating. See, e.g., FIGS. 4-6 of the WIPO publication. U.S. Pat. No. 6,908,233 describes another arrangement for restricting movement of a ferrule in a rotating direction. See, e.g., FIGS. 3B, 3C, and 4 of the '233 patent.

However, conventional techniques do not address the problems or challenges related to the precise and secure seating of the ferrule within the aforementioned strict rotational tolerance requirements, especially for angle polished ferrules.

SUMMARY OF THE INVENTION

According to one aspect, the present invention is directed to a fiber optic connector that includes a connector housing having an opening defined by an inner connector housing wall, the opening extending along a longitudinal direction of the connector housing, an opening wall at least partially surrounding the opening and extending into the opening from the inner connector housing wall, a fiber optic ferrule disposable in the opening, the fiber optic ferrule having a flange extending around at least a portion thereof, and at least one pair of ramps extending into the opening from the inner connector housing wall, each of the at least one pair of ramps connected to the opening wall via a respective non-uniform ramp wall at the opening wall, the flange engaging each of the at least one pair of ramps in at least two places in a final position.

In some embodiments, the final position comprises a position allowing the fiber optic ferrule to resiliently engage a second fiber optic ferrule in a second fiber optic connector.

In some embodiments, the at least one pair of ramps comprises two ramps and the flange engages the two ramps in at least four places in the final position.

In some embodiments, the final position is when a first portion of the flange contacts each ramp in the at least one pair of ramps and a second, different portion of the flange contacts each ramp in the at least one pair of ramps in a different position from the first portion.

In some embodiments, the flange includes a ramp contact edge configured to slide along at least a portion of one of the at least one pair of ramps until rotational motion of the fiber optic ferrule until the final position.

In some embodiments, there is a gap between the flange and a junction of the one ramp surface of the at least one pair of ramps and the non-uniform ramp wall of another of the ramps of the at least one pair of ramps in the final position.

In yet another aspect, there is a fiber optic connector that includes a connector housing having an opening defined by an inner connector housing wall, the opening extending along a longitudinal direction of the connector housing, an opening wall at least partially surrounding the opening and extending into the opening from the inner connector housing wall, a fiber optic ferrule disposable in the opening, the fiber optic ferrule having a flange extending around at least a portion thereof, and at least one pair of ramps extending into the opening from the inner connector housing wall, each of the at least one pair of ramps having a ramp surface and a non-uniform wall and engaging at least a portion of the inner connector housing wall, the flange engaging each of the at least one pair of ramps in at least two places in a final position.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
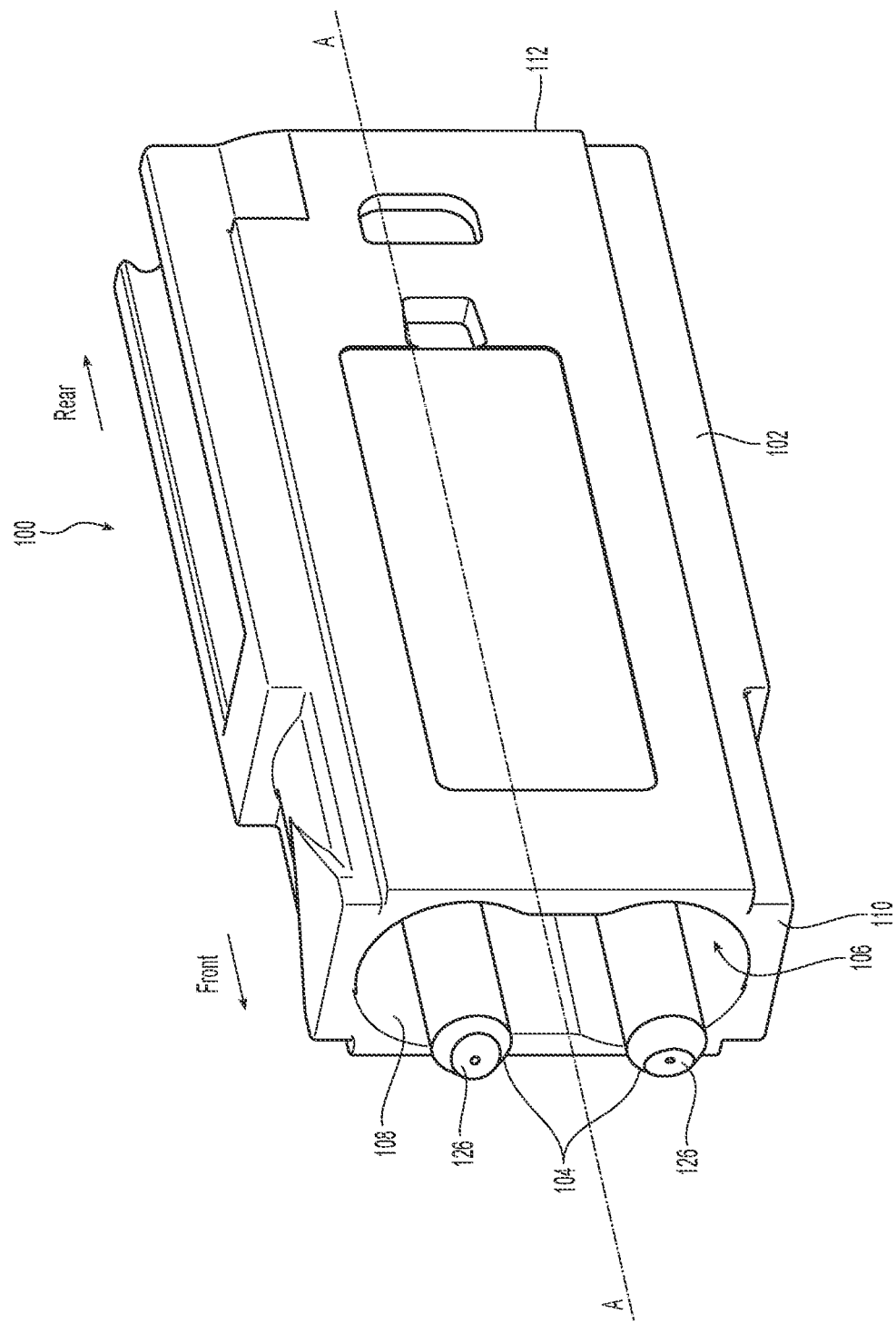
FIG. 1 is a perspective view of one embodiment of a fiber optic connector according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 3:
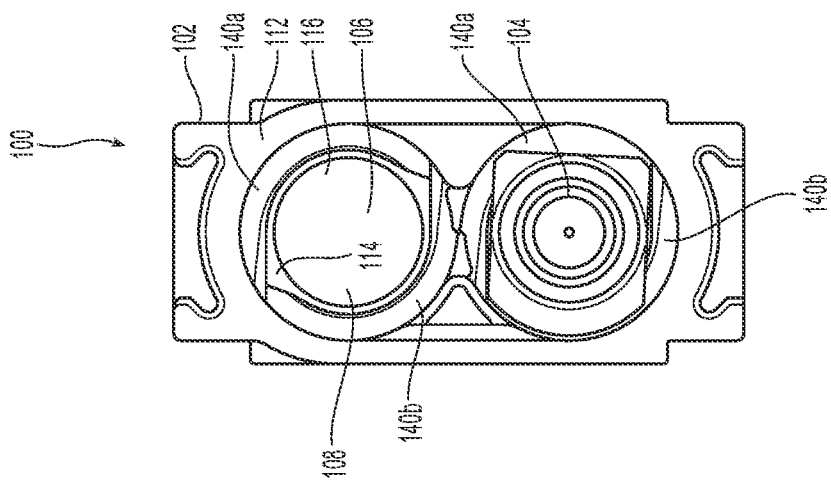
FIG. 3 is a rear elevational view of the fiber optic connector in FIG. 1 with one of the fiber optic ferrules removed for clarity.
Figure 2:
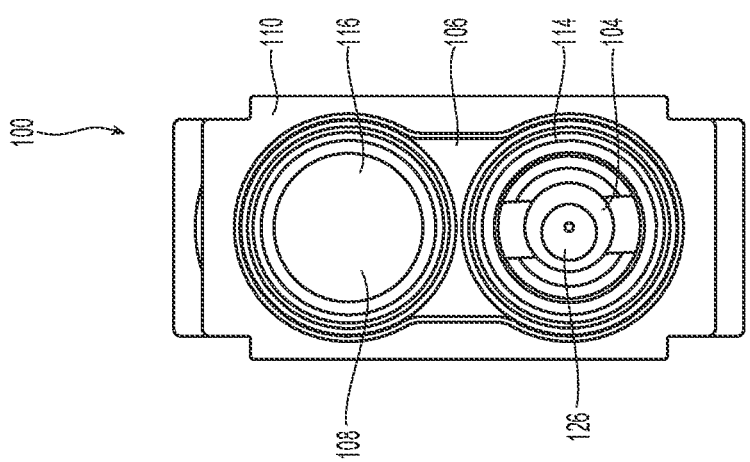
FIG. 2 is a front elevational view of the fiber optic connector in FIG. 1 with one of the fiber optic ferrules removed for clarity.
Figure 5:
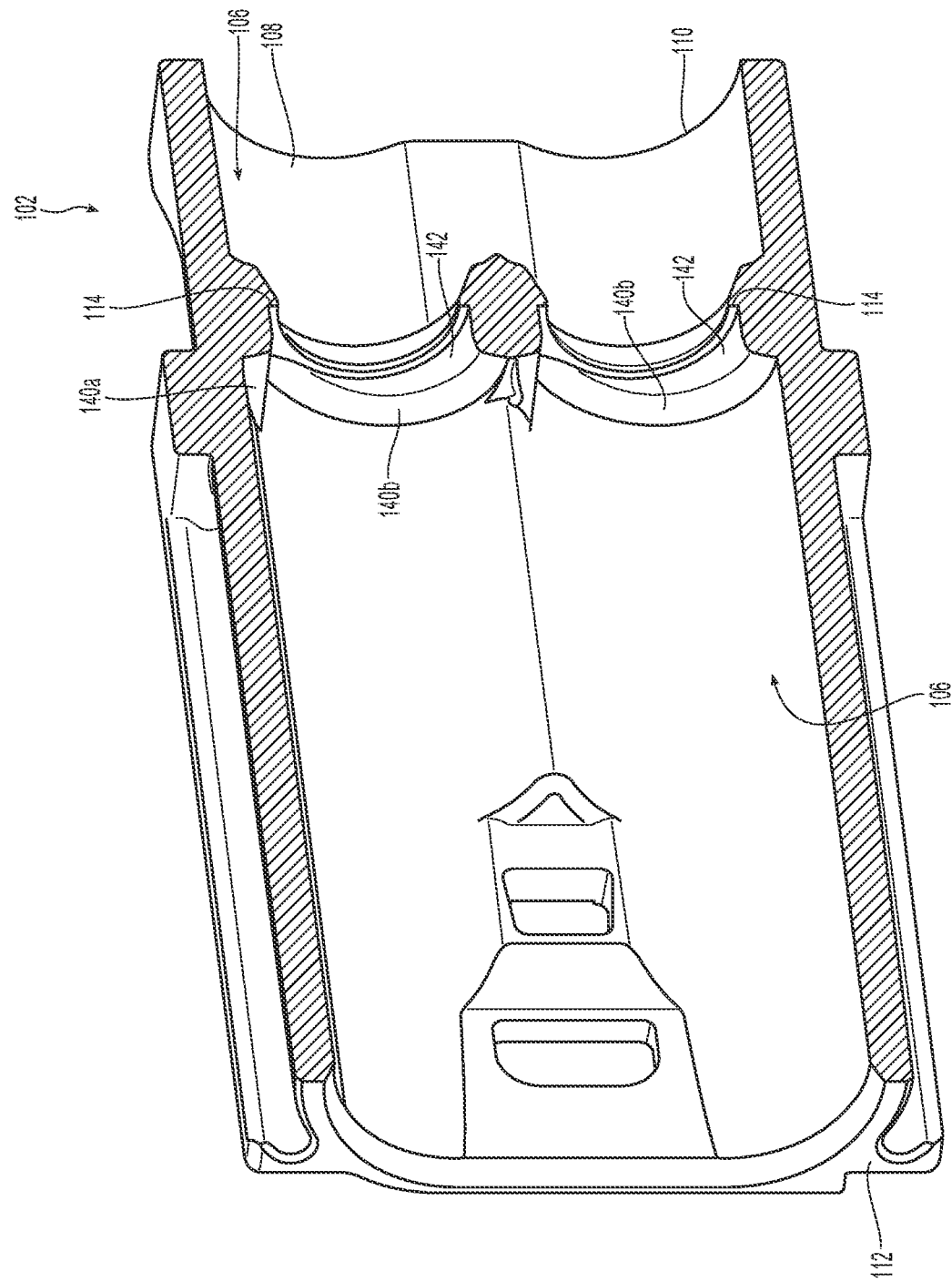
FIG. 5 is a partial view of a cross section of the connector housing of the fiber optic connect in FIG. 1.

Illustrated in FIGS. 1-3 is one embodiment of a fiber optic connector 100 according to the current invention. As visible in FIG. 1, the fiber optic connector 100 includes a connector housing 102 and two fiber optic ferrules 104. Each of the two fiber optic ferrules 104 support an optical fiber (not shown). As is known in the art, there may be other components that are eventually added to the fiber optic connector 100 (e.g., springs, a spring push, crimp ring and crimp band, etc.). In FIGS. 2 and 3, the ends of the fiber optic connector 100 are illustrated with the fiber optic ferrule 104 in the top position of the connector housing 102 removed for clarity. FIG. 2 is an elevation view of the connector housing 102 from the front, while FIG. 3 is an elevation view of the connector housing 102 from the rear. The connector housing 102 has an opening 106 defined, at least in part, by an inner connector housing wall 108. The opening 106 extends from a front end 110 to a rear end 112 of the connector housing 102 along a longitudinal axis A. Within the opening 106 is an opening wall 114 that is closer to the front end 110 than the rear end 112. See FIG. 5. The opening wall 114 extends from the inner connector housing wall 108 into the opening 106. The opening wall 114 may surround the entire opening 106, but may also have breaks in the wall where there is no opening wall 114. See FIGS. 2 and 5. The opening wall 114 is preferably integral with the connector housing 102, but may be added later as a separate component. The opening wall 114 also preferably defines, at least in part, fiber optic ferrule openings 116 to allow a fiber optic ferrule 104 to be inserted into the connector housing 102 from the rear end 112 and partially extend beyond the front end 110. As illustrated, the seating features of the present invention best work with a duplex connector (two fiber optic ferrules with a single optical fiber in each fiber optic ferrule), but could also be used with a mono-fiber/ferrule connector as well, such as an LC or SC connector. The seating features will be discussed below after a discussion of the fiber optic ferrule and a fiber optic ferrule holder.

With reference to FIGS. 6-11, the fiber optic ferrule 104 may also have a fiber optic ferrule holder 120 into which the fiber optic ferrule 104 may be inserted. As is evident in the figures, a rear end 122 of the fiber optic ferrule 104 is inserted into a front opening 124 of the fiber optic ferrule holder 120 and secured therein by any appropriate means. The fiber optic ferrule holder 120 preferably completely surrounds the fiber optic ferrule 104. Alternatively, the fiber optic ferrule holder 120 and the fiber optic ferrule 104 may be a unitary piece, meaning that they are formed together at the same time. As used in herein, fiber optic ferrule would include the fiber optic ferrule 104 with the fiber optic holder 120 or the composite of the fiber optic ferrule with the fiber optic ferrule holder.

The fiber optic ferrule 104 may have an end-face 126 that can be flat polished or angled polished. When the end-face 126 is flat polished, at least a portion, and preferably the whole of, the end-face lies in a plane perpendicular to the longitudinal axis A. When the end-face 126 is angle polished, at least a portion, and preferably the whole of, the end-face 126 lies in a plane that is at an angle to the longitudinal axis A. This angle may be, for example, 82° relative to the longitudinal axis (i.e., at 8° to an equivalent flat polished end-face). Each of the end-faces 126 may face in different directions, as disclosed in Applicant's patent application Ser. No. 17/018,508, entitled "Multi-Ferrule Angled Polished Connector with Simplified Polarity Reversal," filed Sep. 11, 2020 and incorporated by reference herein in its entirety. Alternatively, the fiber optic ferrules 104 may have angle polished end-faces 126 facing in the same direction relative to the longitudinal axis, as is done conventionally with angle polished ferrules. Although the end-face 126 is described as a plane, it is known to one of ordinary skill in the art that the end-face actually has a large radius in a range of 7-30 mm.

Applicant notes that the term "front" or "forward" means that direction where the fiber optic ferrule/connector would meet with another fiber optic ferrule or device, while the term "rear" or "rearward" is used to mean the direction from which the optical fibers enter into the fiber-optic ferrule or fiber optic connector. In the present application, the fiber optic connector 100 and the fiber optic ferrule 104 will therefore have a front and a rear. Thus, in FIG. 1, the "front" of the fiber optic ferrule and connector is on the left side of the figure and pointing out of the figure. The "rear" or "back" is that part of the fiber optic ferrule and connector that is on the right side of the page and "rearward" and "backward" is toward the right and into the page.

The fiber optic ferrule holder 120 has a flange 130 that preferably surrounds the fiber optic ferrule 104 in its entirety. The flange 130, as illustrated best in FIGS. 7-11 has a front section 132, a middle section 134 and a rear section 136. It should be noted that the features of the three sections could be more integrated and less distinct. See, e.g., FIG. 24-27 and related discussion below, illustrating another embodiment of the flange according to the present invention.

Figure 20:
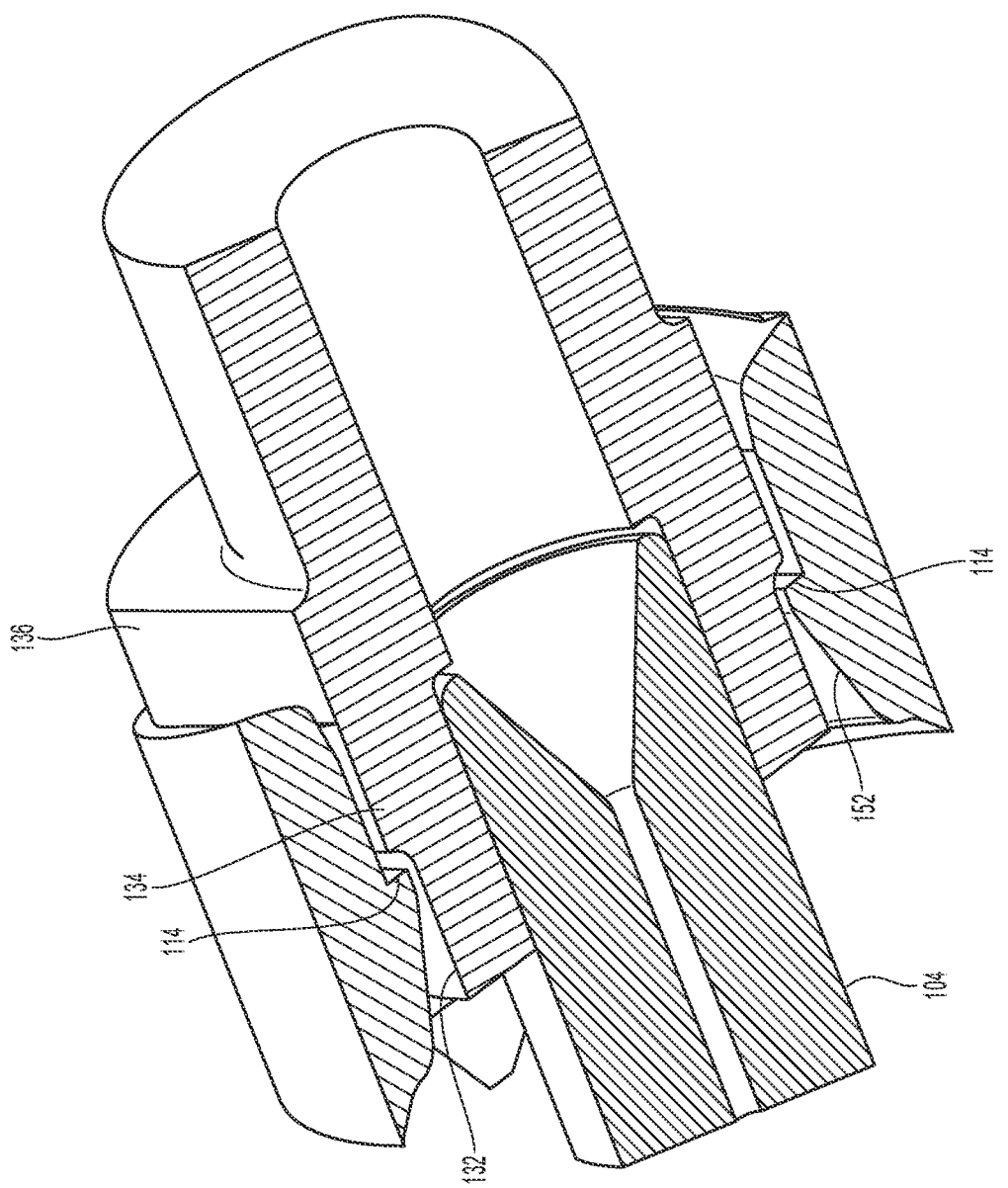
FIG. 20 is a perspective view of a cross section of the ferrule holder in the connector housing showing the relative positioning of the ferrule holder and connector housing.
Figure 21:
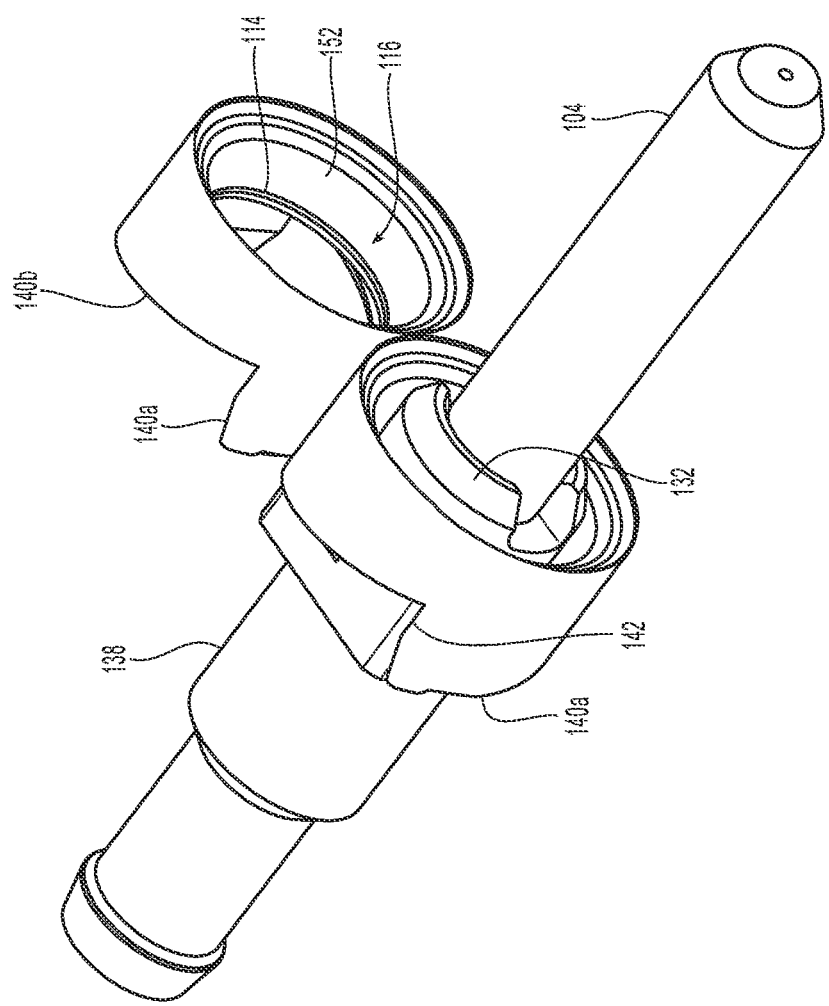
FIG. 21 is a perspective view of a portion of the connector housing with one ferrule holder and fiber optic ferrule being inserted therein.

The flange front section 132 is the section of the flange 130 that surrounds most of the fiber optic ferrule 104 and is inserted through the fiber optic ferrule openings 116 at the opening wall 114. See FIG. 6. The opening 106 is narrower at fiber optic ferrule openings 116 due to the presence of the opening wall 114. Indeed, as is clear from FIG. 6, the flange front section 132 is forward of the opening wall 114 when the fiber optic ferrule 104 is properly seated in the connector housing 104 in a final position of the fiber optic ferrule 104 inside the fiber optic connector 100. The forward facing surface 134a of the middle section 134 (along with other features of the flange 130, as discussed below), prevent the fiber optic ferrule 104 from moving any farther forward than illustrated in FIGS. 6 and 20—past the opening wall 114.

The flange front section 132 may include two notches 132a extending rearwardly from a front edge 132b. These notches 132a may be used to rotate one fiber optic ferrule (and fiber optic ferrule holder 120) after polishing the end-faces 126 to have different angular orientations of the end-faces, as discussed in the aforementioned patent application. However, the flange front section 132 may be optional in some applications, for example, when the fiber optic ferrule 104 does not need to be rotated.

Figure 6:
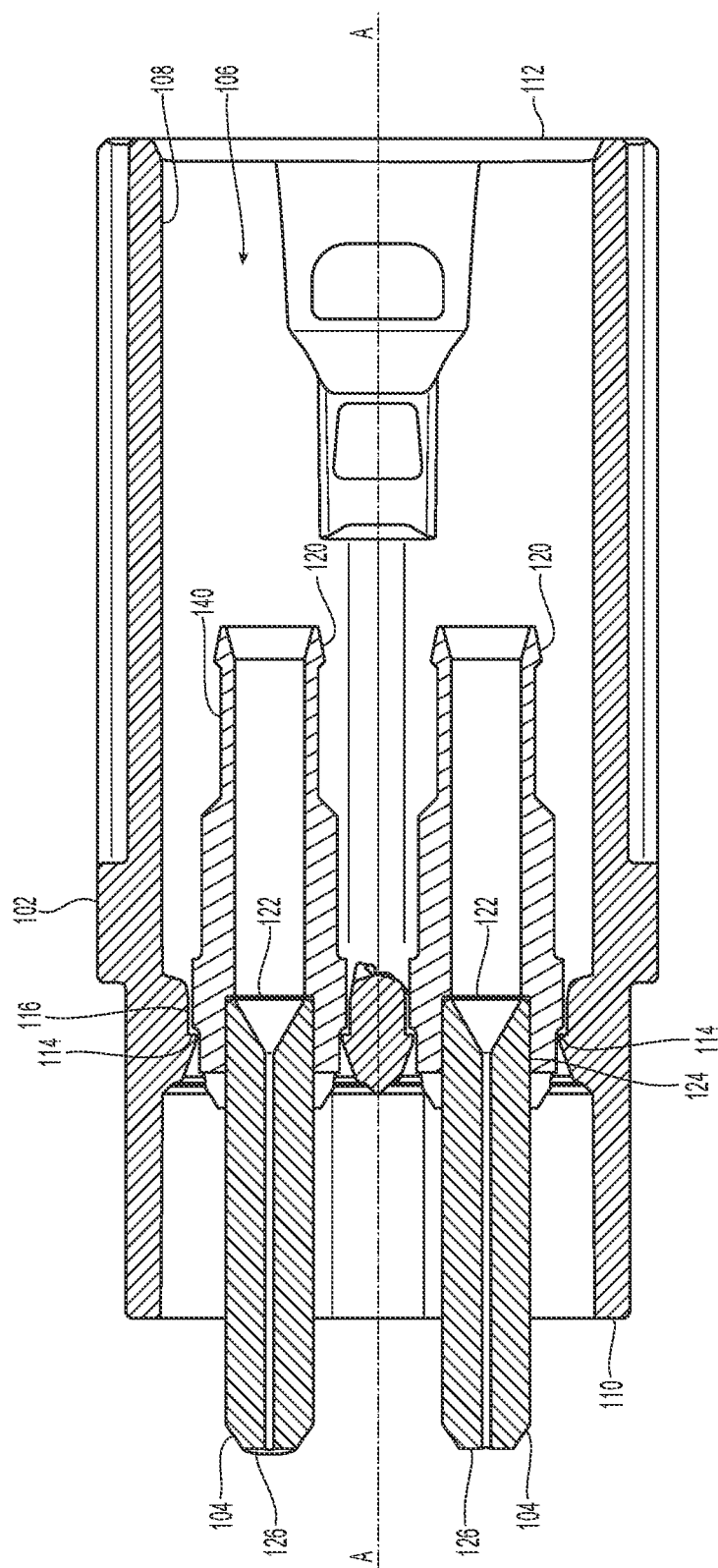
FIG. 6 is a cross section view of the connector housing with fiber optic ferrules and ferrule holder in FIG. 1.
Figure 7:
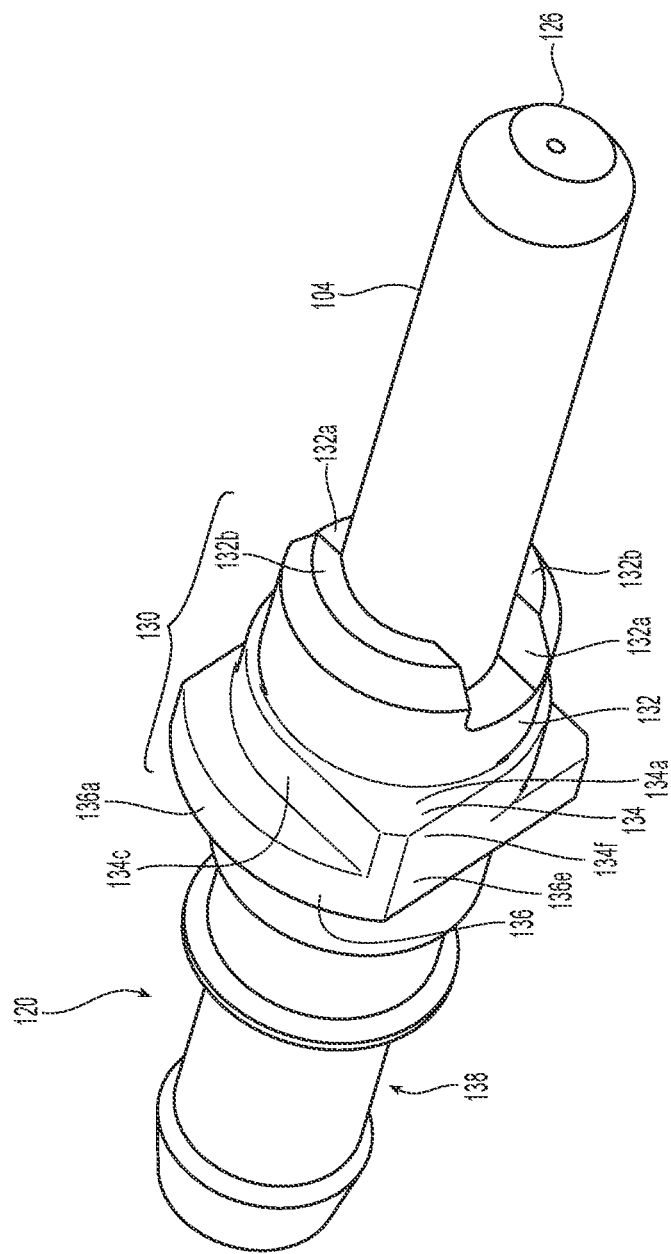
FIG. 7 is a front perspective view of a fiber optic ferrule in a ferrule holder to be used with the fiber optic connector in FIG. 1.
Figure 8:
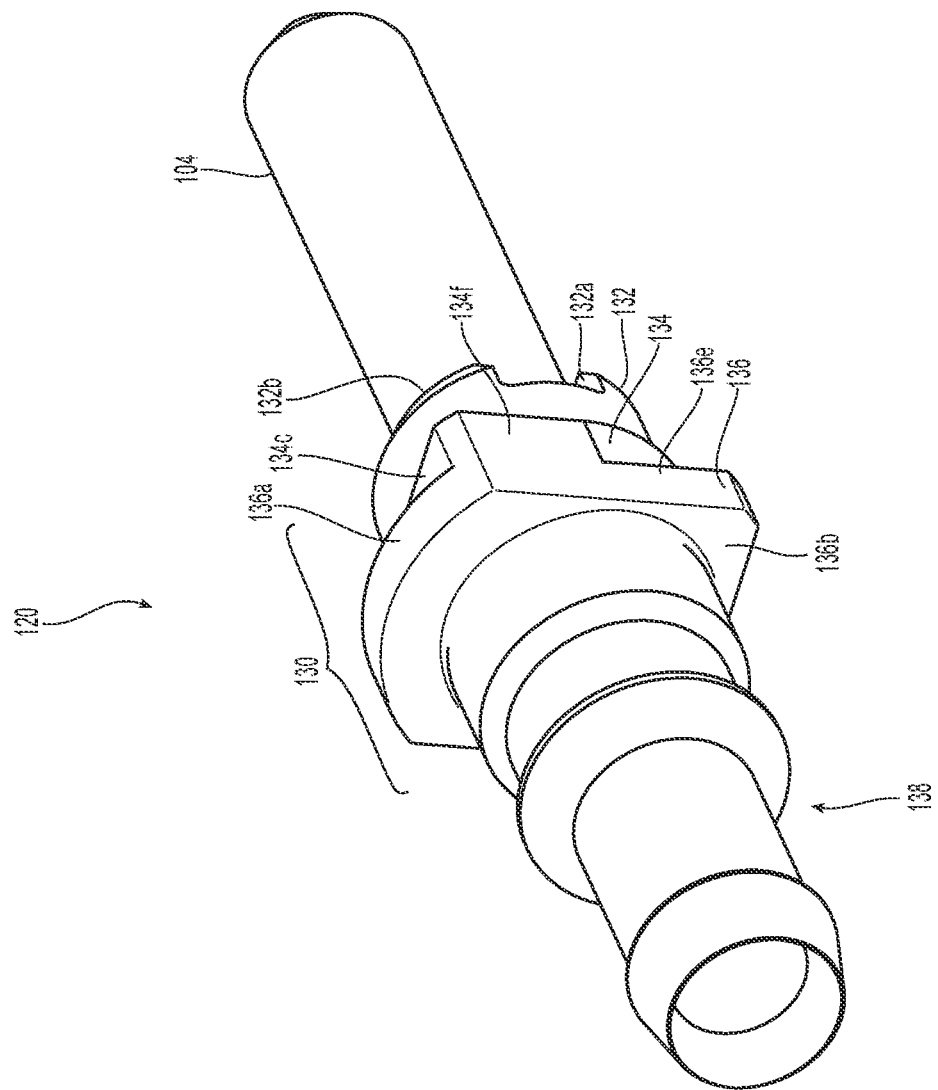
FIG. 8 is a rear perspective view of the fiber optic ferrule in a ferrule holder in FIG. 7.
Figure 17:
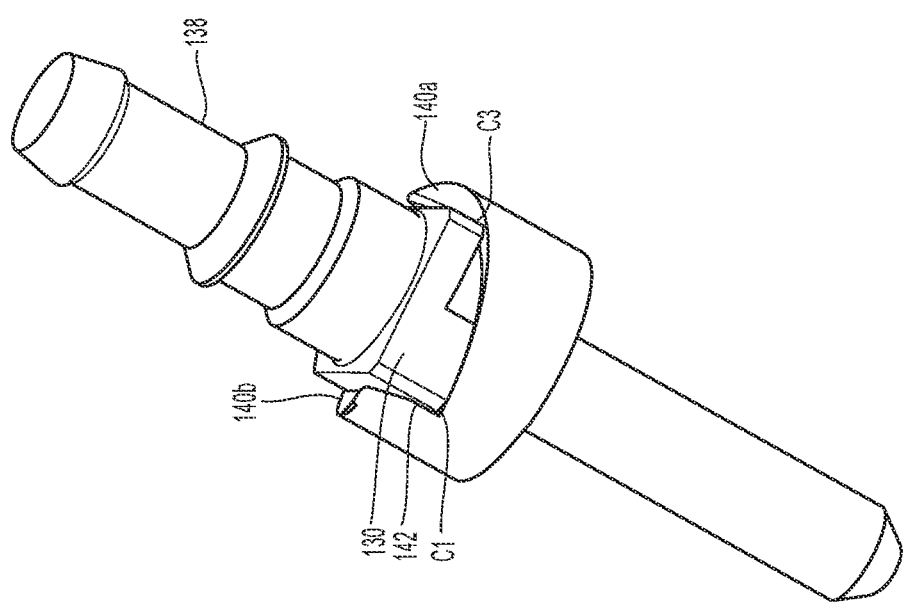
FIG. 17 is a perspective view of the ferrule holder and fiber optic ferrule inserted into the connector housing.

The flange rear section 136 is the portion of the fiber optic ferrule holder 120 that is rearward of the fiber optic ferrule openings 116 when the fiber optic ferrule 104 is seated in the housing (see FIGS. 6 and 17). The fiber optic ferrule holder 120 has a portion 138 that extends rearwardly from the flange rear section 136. The flange middle section 134 is between the flange front section 132 and rear section 136, and has an eye-shaped profile when viewed from the front of the fiber optic ferrule 104. See FIG. 9. The flange middle section 134 and the flange rear section 136 have features or surfaces that interact with the ferrule seating features of the connector housing 102, as will be described in more detail below.

The flange rear section 136 has a flange curved surface 136a that has a radius (R) that is approximately a radial distance from a center of the fiber optic ferrule opening 116 to the inner connector housing wall 108, although this radius could be smaller as long as the flange curved surface 136a can make a contact with the ferrule seating features in the connector housing 102. See, e.g., FIGS. 9, 10. This rear flange section 136 is within a diameter (2R), as indicated by the broken circle around the ferrule flange in FIG. 10. The size of the flange rear section 136 provides a rearward facing surface 136b that functions as a spring seat for a spring (not shown) inserted from the rear end 112 and around a portion 138 of the fiber optic ferrule holder 120. See also, FIG. 8. This spring provides a forward biasing force to keep the ferrule seated on to the ferrule seating features, as further discussed below. When the ferrule is unseated during the mating process, the applied forces are primarily along the longitudinal axis A with minimal to non-existent rotational forces. If rotational forces are encountered (accidentally or intentionally) when the fiber optic ferrule 104 is unmated and re-seated in the connector housing 102, the spring and seating features in the connector housing 102 cause the fiber optic ferrule 104 to return to its original rotational orientation secured to the connector housing 102. See again, e.g., FIG. 6.

The flange rear section 136 also has three flat surfaces 136c, 136d, 136e, giving the flange rear section 136 a D-shaped configuration. The flat surfaces 136c, 136d, 136e, are joined to one another, preferably in a chamfered configuration at the corners 136f See FIG. 11. The flat surfaces may be joined to one another at a 90° angle as well. However, it is preferred that the corners 136f are on or inward from the circle that corresponds to the flange curved surface 136a. See FIG. 10.

Returning to FIG. 9, the engagement of the flange 130 with the connector housing 102 will be described. First, however, it is important to identify the parts of the flange 130 that will make contact. It is also important to note the surfaces of the middle section 134. The middle section 134 has a first flat surface 134a that joins to flat surface 136c of the flange rear section 136, but then curves around with curved surface 134b before joining flat surface 134c by the corner 136f at the right side of FIG. 9. Similarly, on the near side of the flange 130 in FIG. 9, there is flat surface 134d that joins with flat surface 136d before it curves as curved surface 134e (missing the middle corner 136f), and then becomes the flat surface 134f that is joined with flat surface 136e and ends at the opposing corner 136f Thus, there are three surfaces that are comprised of both the middle section 134 and the rear section 136. See also FIGS. 7-9 and 11.

Figure 9:
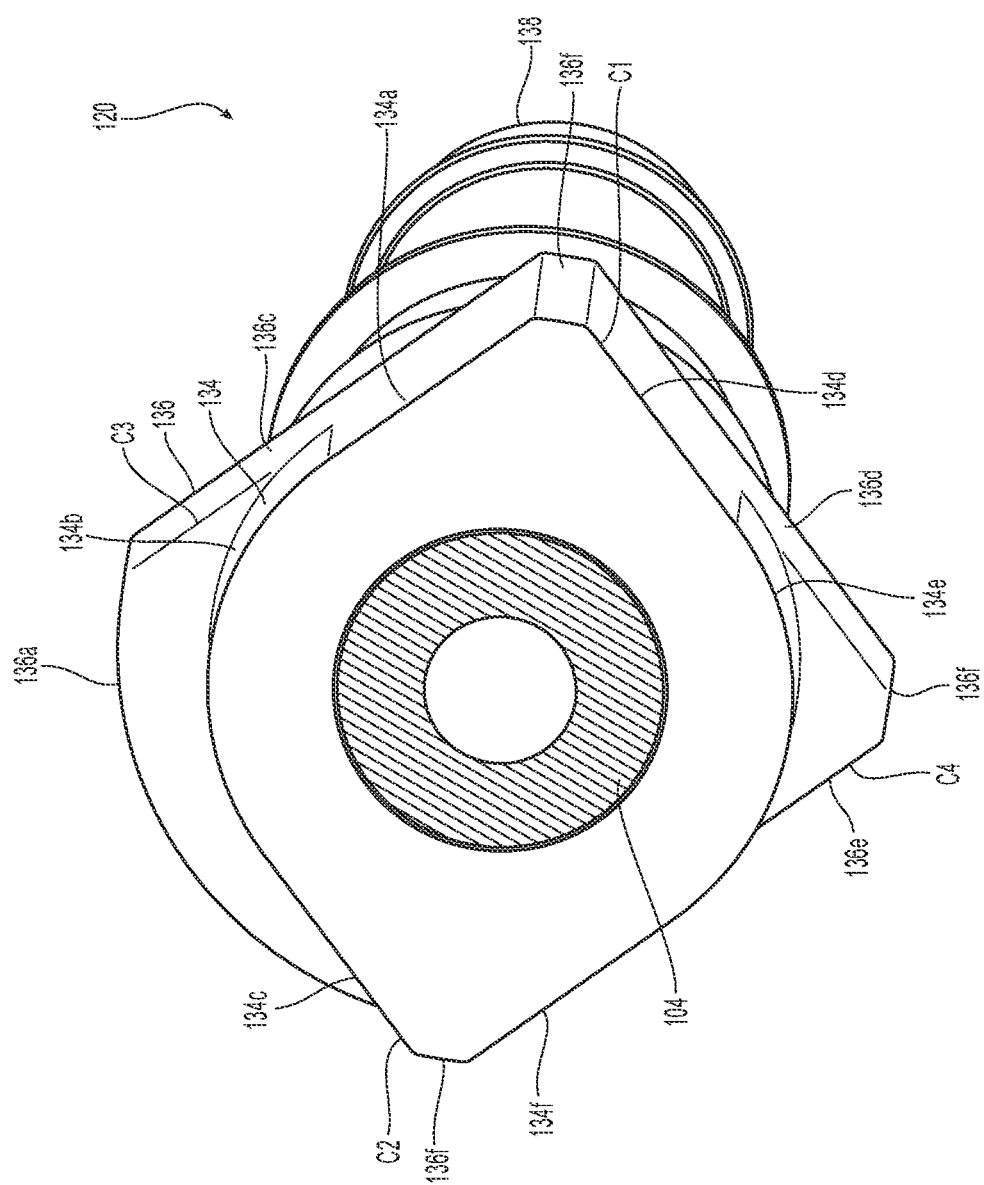
FIG. 9 is a cross section view of the fiber optic ferrule in a ferrule holder in FIG. 7 between the front section and the middle section.
Figure 11:
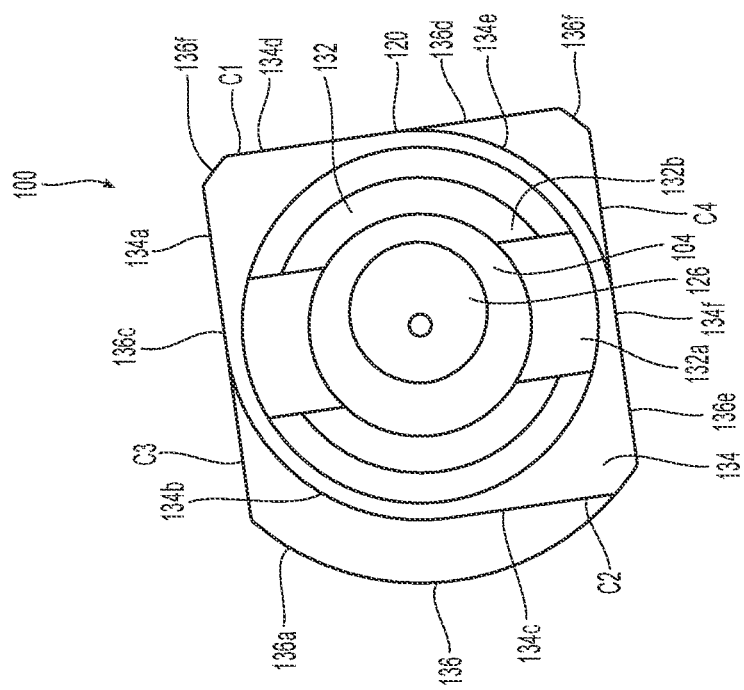
FIG. 11 is a front elevation view of the ferrule holder in FIG. 7.
Figure 10:
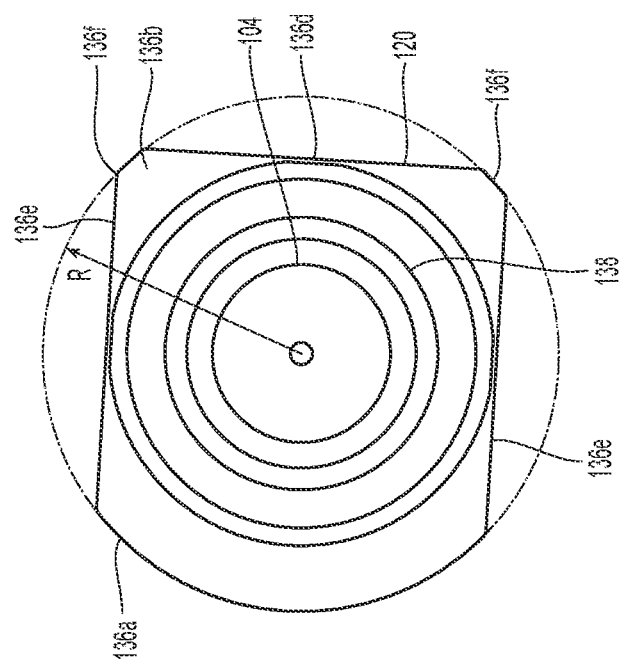
FIG. 10 is a rear elevation view of the ferrule holder in FIG. 7.

Returning back to FIG. 9, the contacts on the flange 130 will now be described. Along the top edges of four of the surfaces are contacts that are used to guide the fiber optic ferrule 104 into the connector housing 102. There are two such contacts on the middle section 134 and two contacts on the rear section 136. The first of these contacts C1 is the top edge of the flat surface 134a from the corner 136f towards the surface 134b. The second contact C2 is the edge of flat surface 134c from the corner 136f to the curved surface 134b. When the fiber optic ferrule 104 is inserted into the connector housing 102, these two contacts C1 and C2 (which in reality are contact lines) will engage the connector housing 102 first. As seen in FIG. 9, C1 and C2 are diagonally oppositely placed relative to each other on the flange 130. There are two additional contacts C3 and C4 found on the rear section 136, which too are diagonally opposite to each other. The third contact C3 is the top edge of surface 136c near the curved surface 136. The fourth contact C4 is the top edge of flat surface 133 between the corner 136f and the junction with flat surface 134f of the middle section. It may be noted there that two of the contacts are on the middle section 134 and two are on the rear section 136. Since the middle section is closer to the front of the fiber optic ferrule 104, then it is expected that the contacts C1 and C2 would engage the connector housing before the contacts C3, C4 on the more rearward portion of the flange 130.

Figure 4:
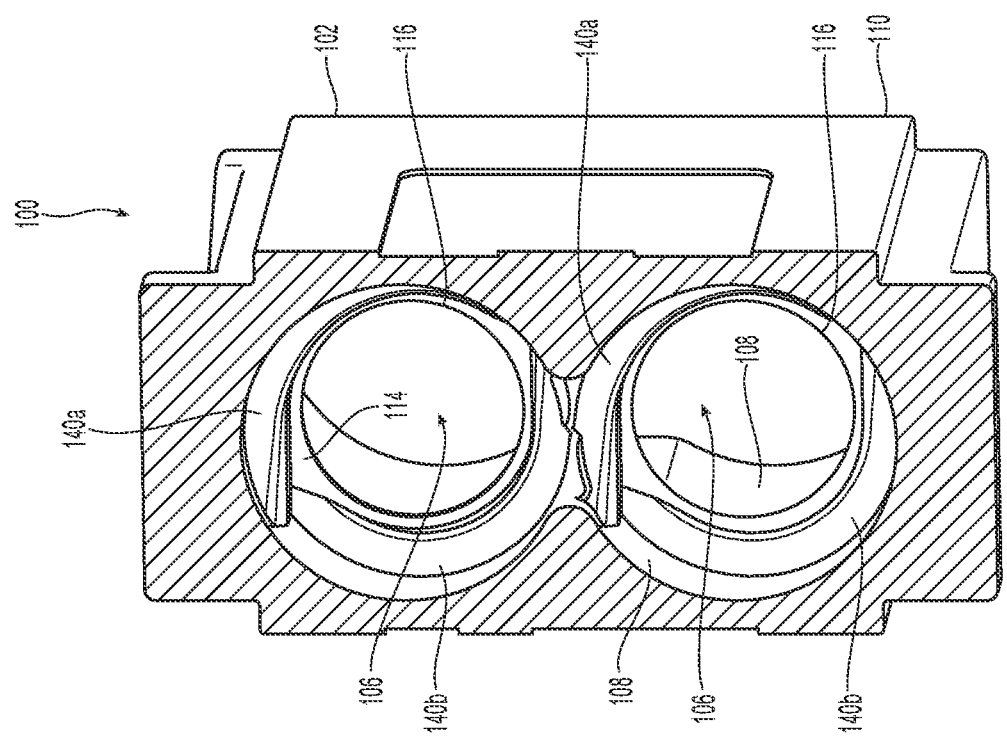
FIG. 4 is a cross sectional view of the connector housing of the fiber optic connector in FIG. 1.

The structures that the contacts C1-C4 will engage as the fiber optic ferrule 104 is being inserted into the connector housing 102 is at least one pair of ramps 140 that extend into the opening 106 defined by the inner connector housing wall 108. Preferably the at least one pair of ramps 140 is a pair of ramps 140a, 140b for each of the fiber optic ferrule openings 116, thereby having two pairs of ramps 140 for the connector housing 102. Each of the ramps 140a, 140b also preferably engage a rear side portion of the opening wall 114. See FIG. 3. Returning to FIGS. 3-5, there are the two ramps 140a and 140b in each of the fiber optic ferrule openings 116. As illustrated in FIG. 4, the ramp 140a starts that the top of the fiber optic ferrule opening 116 and extends around to the right and ends adjacent the start of ramp 140b at the bottom of the fiber optic ferrule opening 116. Further, the ramp 140b continues to a beginning of the ramp 140a. As seen in the cross section in FIG. 5, the ramps 140a, 140b are jointed to the opening wall 114 by ramp walls 142 that follow the inside of the connector housing 102 and the ramps 140a, 140b. Thus, the ramp walls 142 are non-uniform ramp walls around the interior of the connector housing 102. It is possible that there not be any additional structures that support the ramps 140a, 140b other than their connection to either or both of the inner connector housing wall 108 and/or the opening wall 114. The ramps are curved and slope inward to the front of the connector housing 102. Thus, the ramps are generally a helical curve. This helical curve is another explanation for the ramp walls 142 to be of non-uniform dimension around the opening wall 114. However, other geometries (non-helical, non-linear or linear, elliptical, and the like) may be utilized. It should also be noted that the ramps 140a, 140b are both oriented in the connector housing 102 in the same way—that is the starting and stopping of the ramps 140a, 140b is the same for both fiber optic ferrules 104 being inserted into the connector housing. Further, in an alternative arrangement, the ramp walls 142 may be absent, in which scenario the ramps 140a, 140b will have a curved geometry to directly join the opening wall 114 without any intermediate structure. In an alternative embodiment, the ramp walls 142 could be uniform. For example, the pair of ramps 140 could be shaped as a chamfer (similar to the chamfered surface 152), but may not fully surround the ferrule opening 116. That is, there would be a break in the ramps 140. In this embodiment, the ramp walls 142 would join the radially innermost circumference of the ramps 140 to the opening wall 114 and the ramp wall would have the same uniform dimension. The flange 130 would then have projecting features that would fall/fit into those breaks to securely seat the fiber optic ferrule 104 between the two (or more) ramps 140.

Turning now to FIGS. 12-21, the process of inserting the fiber optic ferrule 104 will be described. It should be noted in these figures that only the ramps 140a, 140b, the ramp walls 142, and the opening wall 114 (seating features) are illustrated for clarity purposes. The connector housing 102 has been removed for better visualization.

Figure 12:
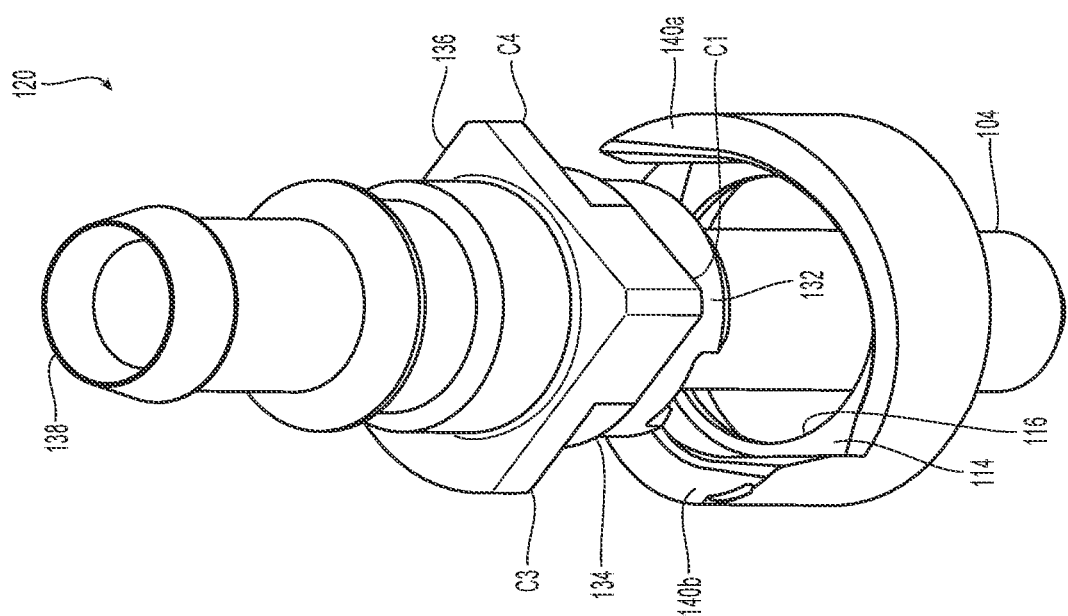
FIG. 12 is a perspective view from the rear of the ferrule holder with a portion of the connector housing.
Figure 13:
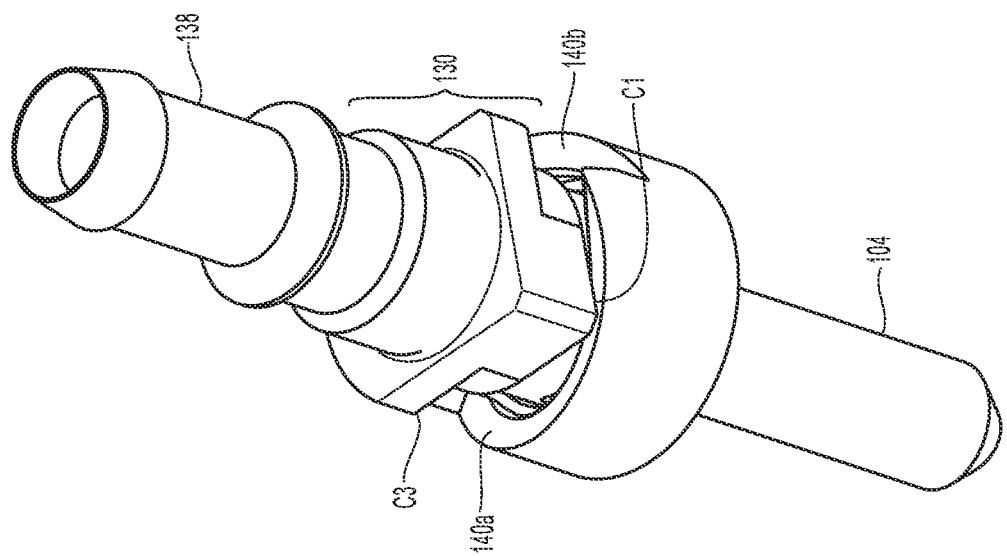
FIG. 13 is a perspective view of the ferrule holder with a portion of the connector housing being inserted therein.
Figure 14:
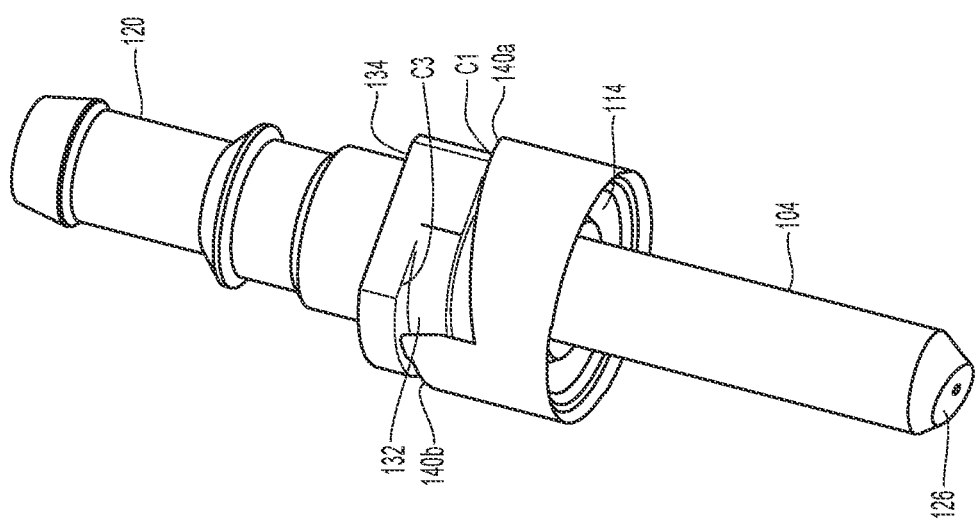
FIG. 14 is a perspective view of the ferrule holder with a portion of the connector housing showing the contact points of the ferrule holder with the ramps in the connector housing.
Figure 15:
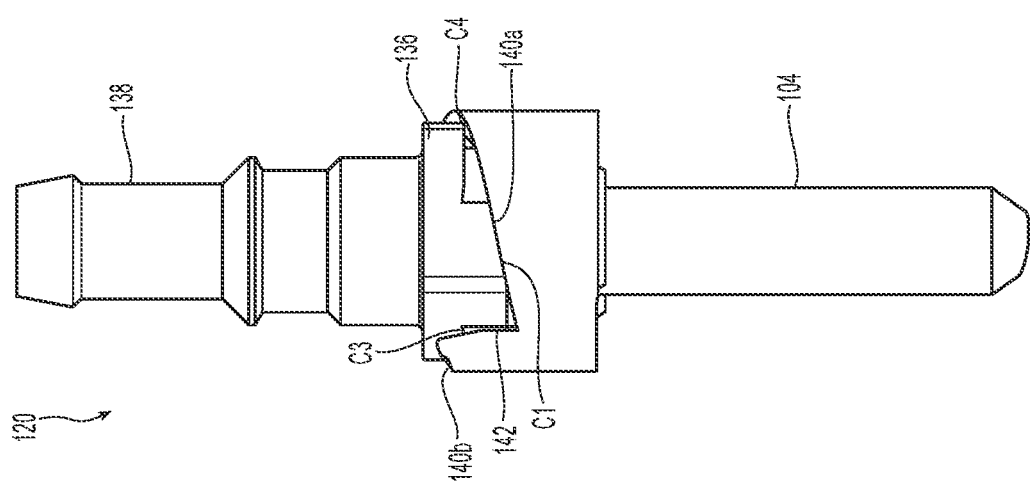
FIG. 15 is an elevation view of the ferrule holder and portion of the connector housing of FIG. 14.

FIG. 12 illustrates the fiber optic ferrule 102 approaching the seating features and passing through the fiber optic ferrule opening 116. The flange front section 132 of the flange 130 will also pass through the fiber optic ferrule opening 116. The next thing to engage the seating features, and the ramps 140a, 140b in particular, will be the first contacts C1 and C2. C2 is not visible on the other side of the flange 130 in FIG. 12, but would engage ramp 140b in the same way as C1 is engaging ramp 140b in that figure. It is not mandatory that the contacts C1 and C2 be aligned with the top portion of the ramps 140a, 140b. If the fiber optic ferrule 104 is not perfectly aligned with the ramps 140a, 140b, then the user will feel resistance to that and rotate the fiber optic ferrule 102. The contacts C1 and C2 will engage the ramps 140a, 140b and start to rotate in a counter clockwise direction in FIG. 12. At the same time, the fiber optic ferrule 102 is also translating into the seating features and the connector housing 102. Thus, the ferrule protrudes farther through the fiber optic ferrule opening 116 as it is rotated. FIG. 13, shows the flange 130 first engaging the ramps 140a, 140b. FIG. 14 shows the third contact C3 engaging the ramp 140a since the fiber optic ferrule 104 has been sufficiently rotated and translated so that C3 (and C4 on the back side in the figure) will now guide the fiber optic ferrule 104 and the flange 130 along the ramps. At this point, there are now four contacts between the flange 130 and the ramps 140a, 140b. This provides for a stable and aligned condition to further rotate the fiber optic ferrule 104. In FIG. 15, the fiber optic ferrule 104 has continued to be rotated toward the final position. In this position, the wall 142 is in contact with the third contacts C3 in FIG. 15 (and also, on the diagonally opposite side with the first contact C1, not visible in FIG. 15). In addition, the fourth contact C4 is in engagement with the first ramp 140 (and likewise, on the diagonally opposite side for the first contact C1, not visible in FIG. 15).

Figure 16:
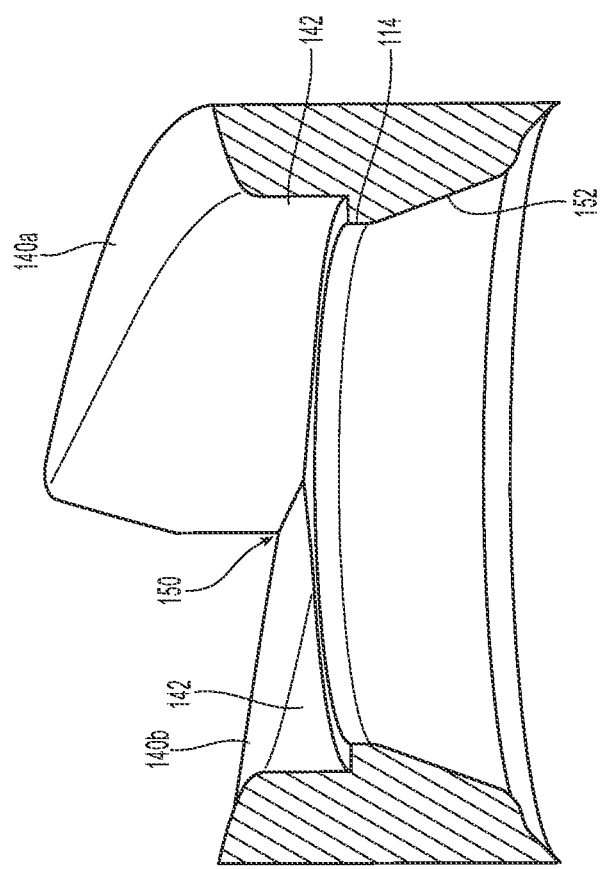
FIG. 16 is an elevation view of a cross section of the seating features in the connector housing.
Figure 18:
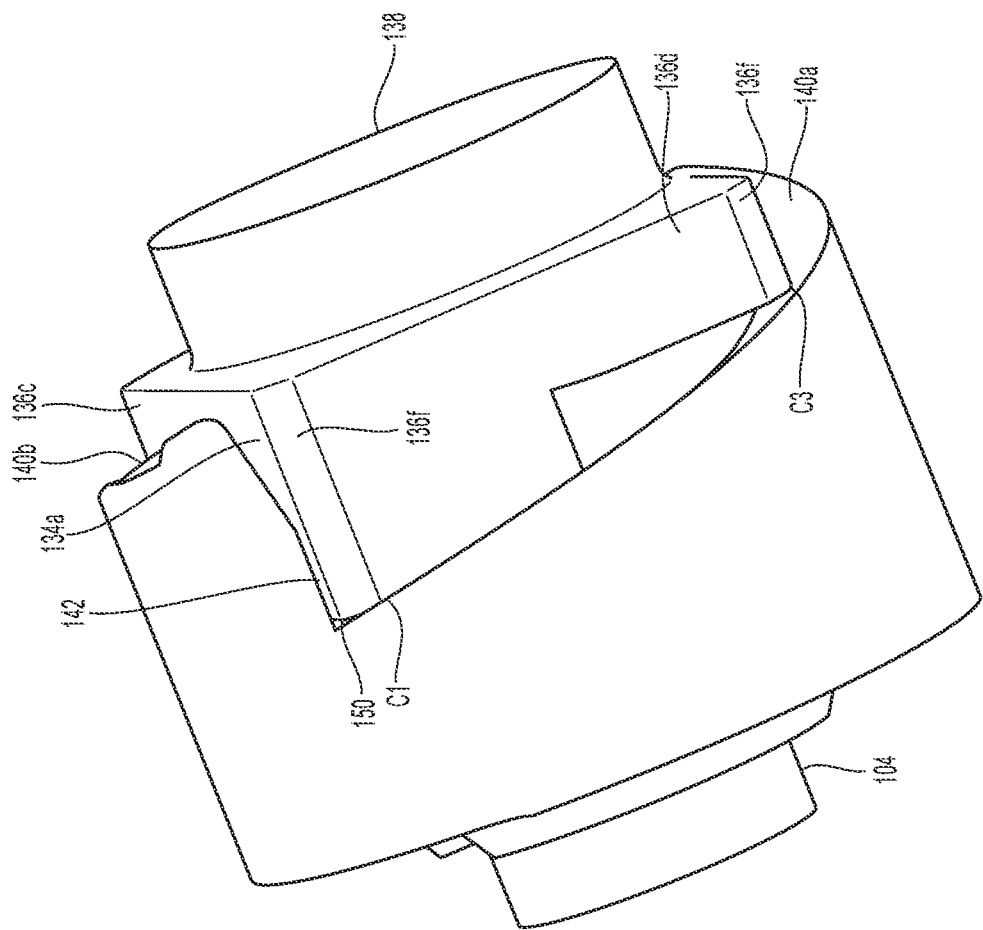
FIG. 18 is an enlarged view of the ferrule holder fully seated in the connector housing.
Figure 19:
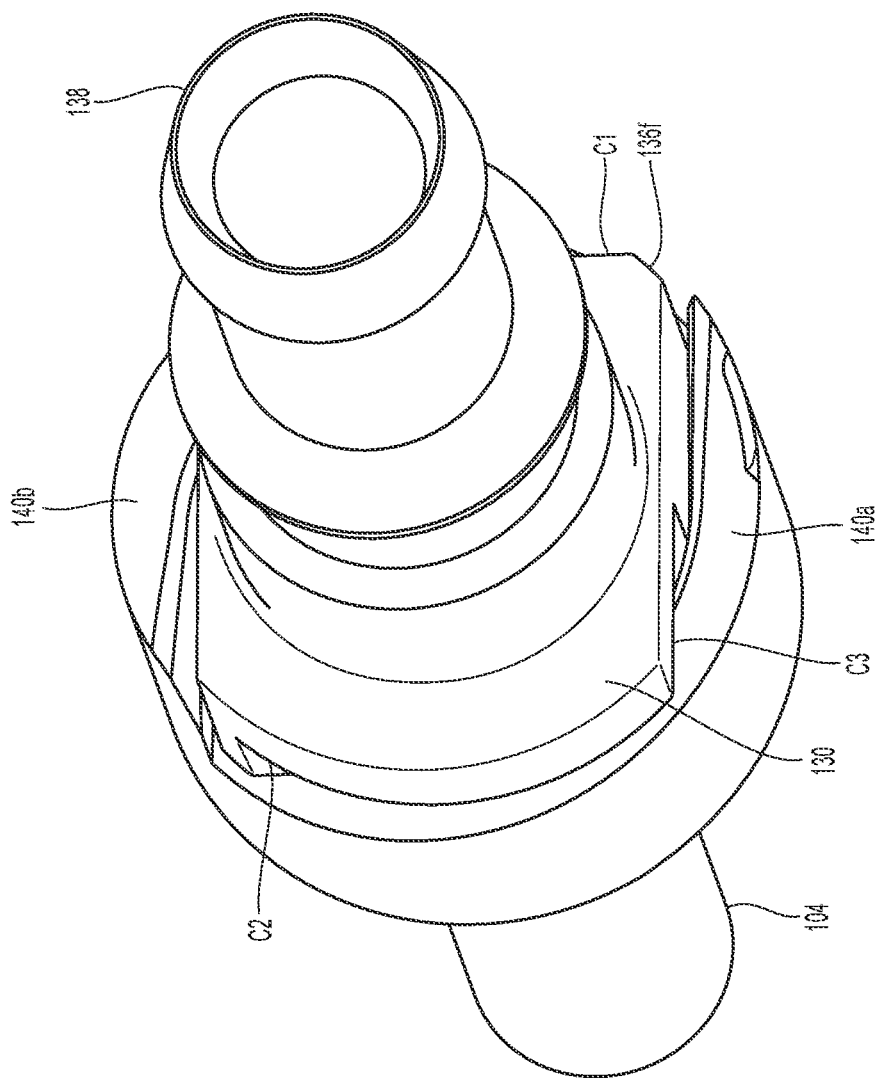
FIG. 19 is a perspective view from the rear of the ferrule holder inserted into the connector housing.

In FIGS. 17-21, the fiber optic ferrule 104 has been rotated to a final position. The junction of the flat surfaces 136c and 134a with the corner 136f engage the wall 142 of the second ramp 140b. This engagement prevents any further rotation of the fiber optic ferrule 104 relative to the ramps 140a, 140b. The same is true on the opposite side of the assembly with the other wall 142 of the first ramp 140a. As can be seen in FIG. 18, there is a slight gap 150 between the flange and the ramp 140a at the end. This configuration is also shown in FIG. 16, which is an elevation view of that location with the fiber optic ferrule 104 removed. Also visible in this figure is the opening wall 114 and a chamfered surface 152 on the front side of that opening wall 114. This chamfered surface 152 allows for the fiber optic ferrule 104 to float during mating with another fiber optic ferrule. In the aforementioned final position, the fiber optic ferrule 104 is considered fully seated and secured inside the fiber optic connector 100. That is, the only substantial movement that the fiber optic ferrule 104 can then undergo is in the longitudinal direction, e.g., during polishing thereof, or mating with another fiber optic ferrule of another opposing fiber optic connector. Accordingly, in the final position the fiber optic ferrule 104 has a maximum angular rotation about the longitudinal direction that is less than 1°. Thus, the ferrule has negligible angular rotation, which is useful for angled polished end-face ferrule connections. Indeed in practice, the fiber optic ferrule 104 may not be able to rotate at all (0°).

Figure 22:
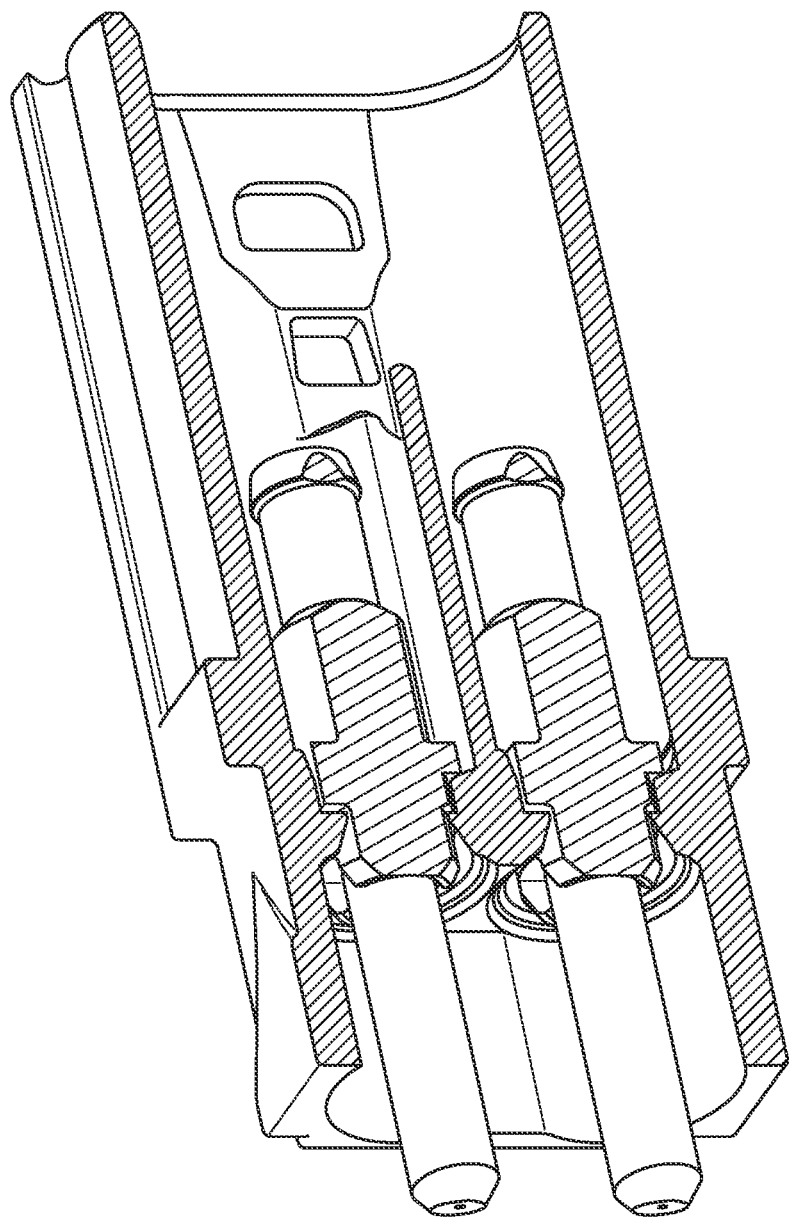
FIG. 22 is another perspective view of the ferrule holder with a portion of the connector housing.

FIG. 22 illustrates two fiber optic ferrules 104 installed in a final position in the connector housing 102. The configuration in FIG. 22 is for an unmated connector. As seen, the two fiber optic ferrules 104 are generally positioned parallel to each other longitudinally, as is the configuration in a duplex fiber optic connector.

Figure 23:
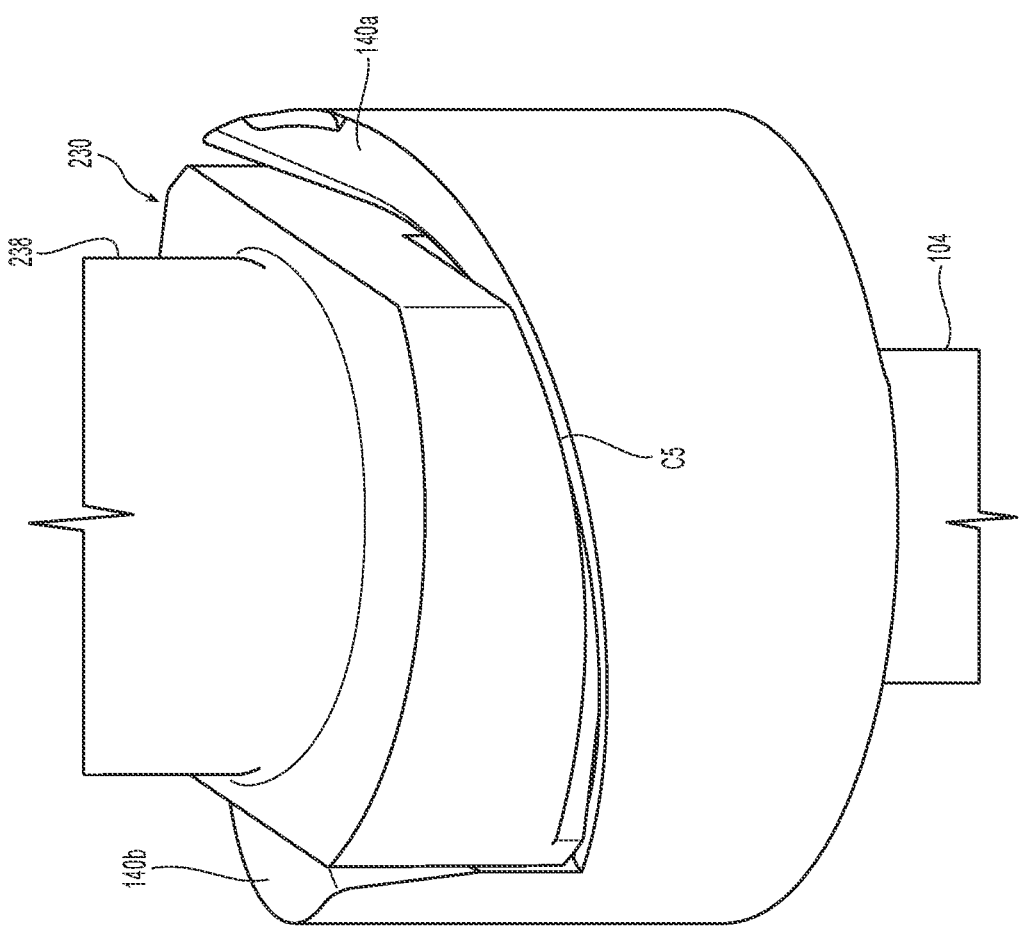
FIG. 23 is a perspective view of another embodiment of a ferrule holder according to the present invention showing a contact surface making contact with a portion of the connector housing.
Figure 24:
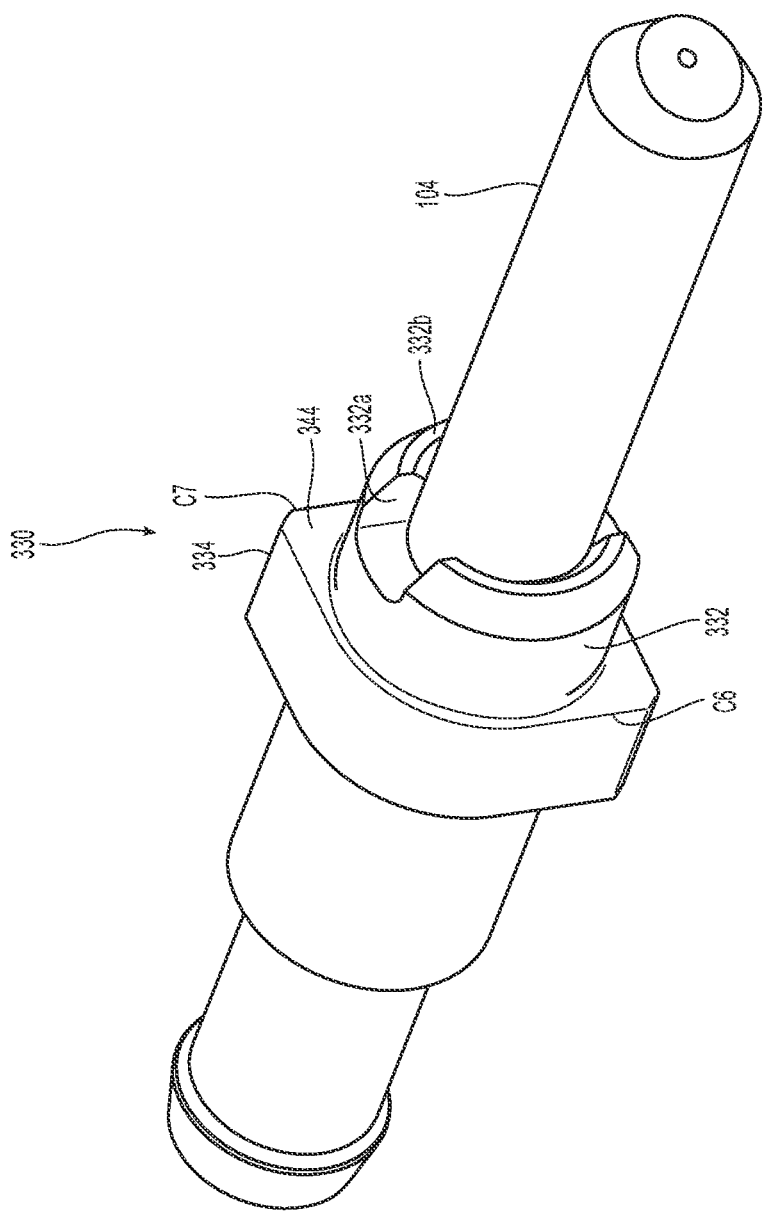
FIG. 24 is a perspective view of another embodiment of a ferrule holder according to the present invention.
Figure 26:
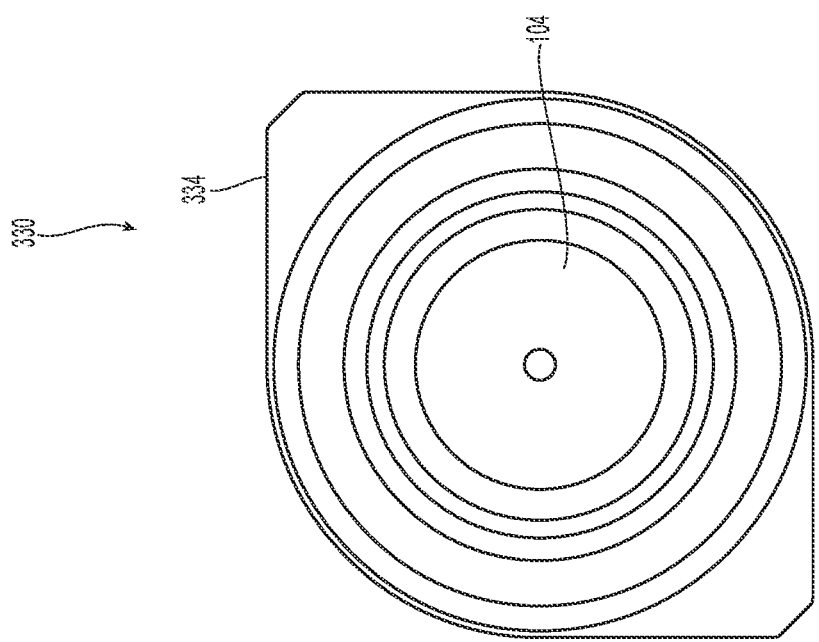
FIG. 26 is a rear elevation view of the ferrule holder of FIG. 23.
Figure 25:
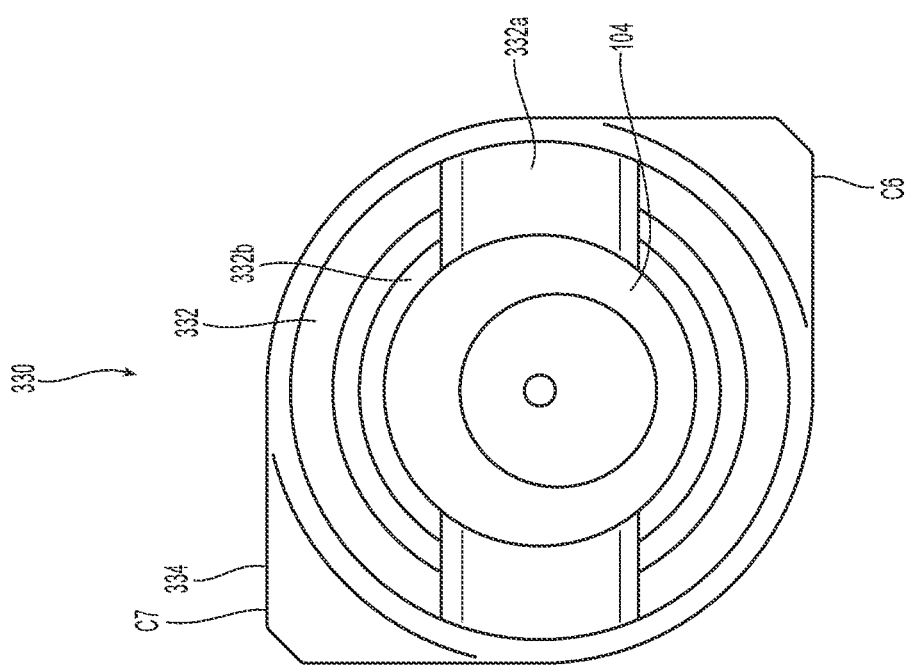
FIG. 25 is front elevation view of the ferrule holder of FIG. 23.
Figure 28:
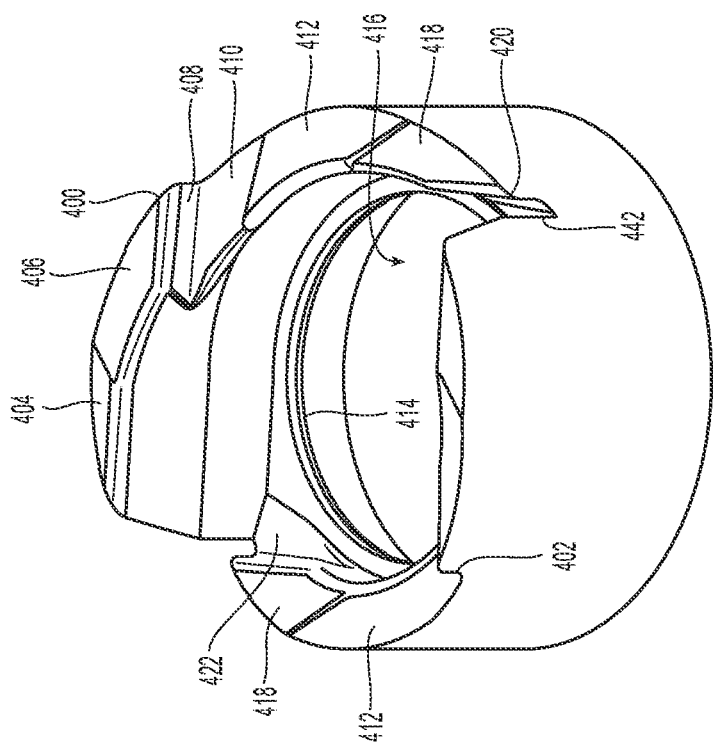
FIG. 28 is a perspective view of another embodiment of a portion of a connector housing according to the present invention.
Figure 27:
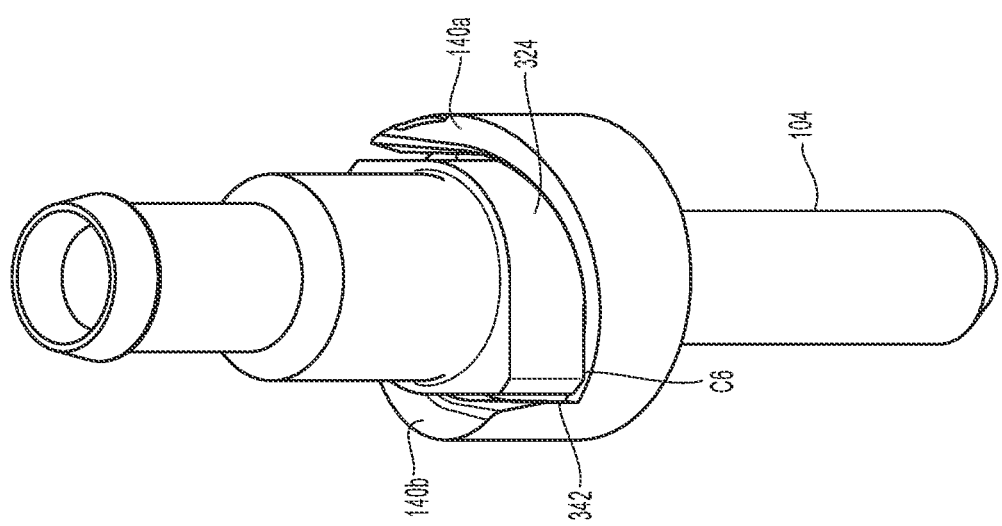
FIG. 27 is a rear perspective view of the ferrule holder of FIG. 23.

Another embodiment of a flange 230 according to the present invention is illustrated in FIG. 23. The rear portion 238 is illustrated on the top of the figure, while the fiber optic ferrule 104 passes through the opening wall (not showing) in a downward position. In this embodiment, the contact of the flange 230 with the ramps 140a and 140b is larger than in the first embodiment and is configured to match that of the ramps 140a and 140b. The flange 130 has a surface C5 that makes contact with the ramp 140a. There is another such surface on the opposite side in the figure that makes contact with the ramp 140b. The surface C5 essentially joins the contacts C1 and C3 from the prior embodiment. That means that the distinction between the middle section and the rear section of the flange 130 is less pronounced if not essentially eliminated in this embodiment. However, the larger surface allows for an even smoother rotation of the flange 130 to the final position illustrated in FIG. 23.

FIGS. 24-27 illustrate another embodiment of a flange 330 according to the present invention. In this embodiment, the flange 330 does not have a rear section (like the rear section 136 in the flange 130. The flange 330 has the same front section 332 as does the flange 130—that is, the flange front section 332 receives the fiber optic ferrule 104 and is inserted through the fiber optic ferrule openings 116 in the opening wall 114. The flange front section 332 may include two notches 332a extending rearwardly from a front edge 332b. These notches 332a may be used to rotate one fiber optic ferrule (and fiber optic ferrule holder 120) after polishing. Again, there may not be a need for the notches 332a.

The second or middle section 334, generally relating to the middle section 134 above, has an eye-shaped profile when viewed from the front of the fiber optic ferrule 104. See FIGS. 25 and 26. There are at least two contact positions on the flange 330—C6 and C7, which generally correspond to the contacts C1 and C2 in the prior embodiment. These two contacts make contact with at least one of the ramps 140a, 140b at all times, as the fiber optic ferrule 104 is being seated inside the fiber optic connector 100. To get to the final position, the middle section 334 may engage the ramps or the walls 342 that join the ramps 140a, 140b to the opening wall 114, as in the prior embodiment. See FIG. 27.

The middle section 334 has a forward facing surface 344 that is preferably flat. However, that forward facing surface 344 could be modified to allow for additional surfaces that make contact with the ramps 140a, 140b, which would provide for a more stable interaction between the flange 330 and the ramps 140a, 140b. For example, the surface 344 could have a curved configuration that would match that of the ramps 140a, 140b.

Figure 29:
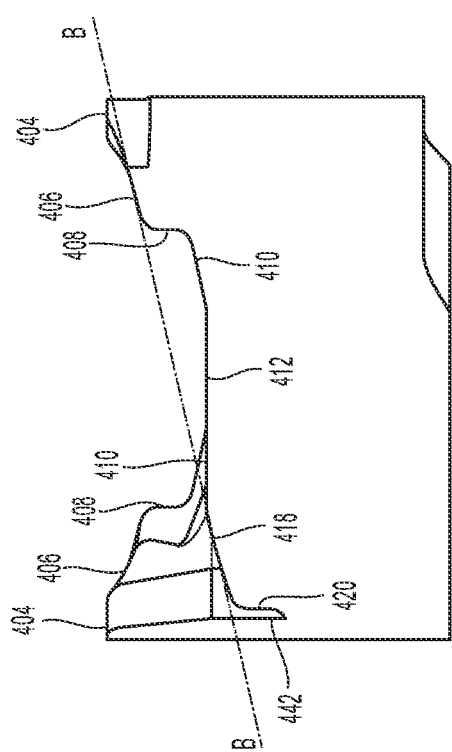
FIG. 29 is a side elevation view of the portion of the ferrule holder of FIG. 28.

Illustrated in FIGS. 28-33 is another set of seating features, in particular with regard to the ramps with the connector housing 102 again removed for clarity and simplicity. In this embodiment, there are two ramps 400 and 402 that make up one embodiment of the at least one pair of ramps. These two ramps 400 and 402 are on opposing sides of the fiber optic ferrule opening 416 to allow a fiber optic ferrule 104 to be inserted therein. The fiber optic ferrule opening 416 results from the opening wall 414 extending into the opening of the connector housing 2. Each of the two ramps 400 and 402 have a number of different surfaces thereon. Ramp 400 will be used to describe the surfaces, but the discussion equally applies to the second ramp 402. Preferably the ramp 400 begins with a flat surface 404 (generally in a plane parallel to the opening wall 414), which then transitions into a ramp or sloped surface 406. Immediately following the sloped surface 406 is preferably a step (a discontinuity) 408 and then another ramped or sloped surface 410. Then there is a flat surface 412 (also optionally parallel to the opening wall 414) before encountering another ramp or sloped surface 418. There is then a larger step 420 with a joining ramp surface 422 that engages the ramp wall 442 of the other ramp 402 and the opening wall 414. See FIGS. 28 and 29. As illustrated in FIG. 29, the two ramped or sloped surfaces 410 and 418 preferably have the same slope and are a continuation of each other—see line B. The relative sizes (lengths) can be changed, i.e., the individual surfaces can be longer or shorter, there can be more or fewer surfaces, the slopes can be more gradual or steeper, etc. It should be noted that the flat portions 404 (and 406) cannot extend too far upward such that it interferes with a spring that engages the back of the flange 130. See, e.g., FIGS. 31 and 32. If this were to happen, then the spring would engage those flat portions 404 and cause the force exerted by the spring to be off center. However, the flat portions 404 may be even with the back of the flange 130.

Figure 30:
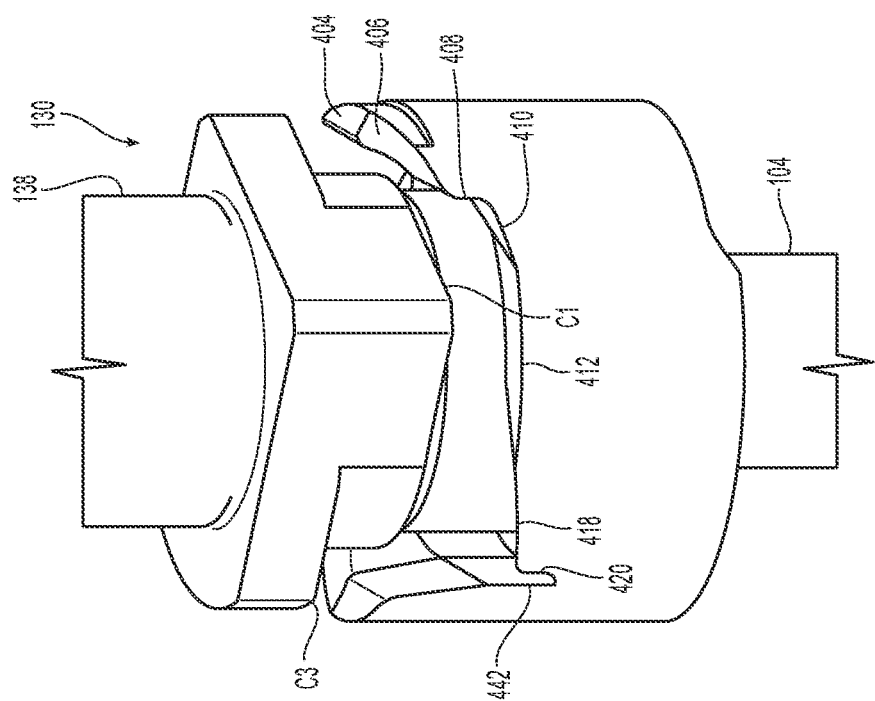
FIG. 30 is a side perspective view of the portion of the connector housing with the ferrule holder of FIG. 7 being inserted into the connector housing.
Figure 31:
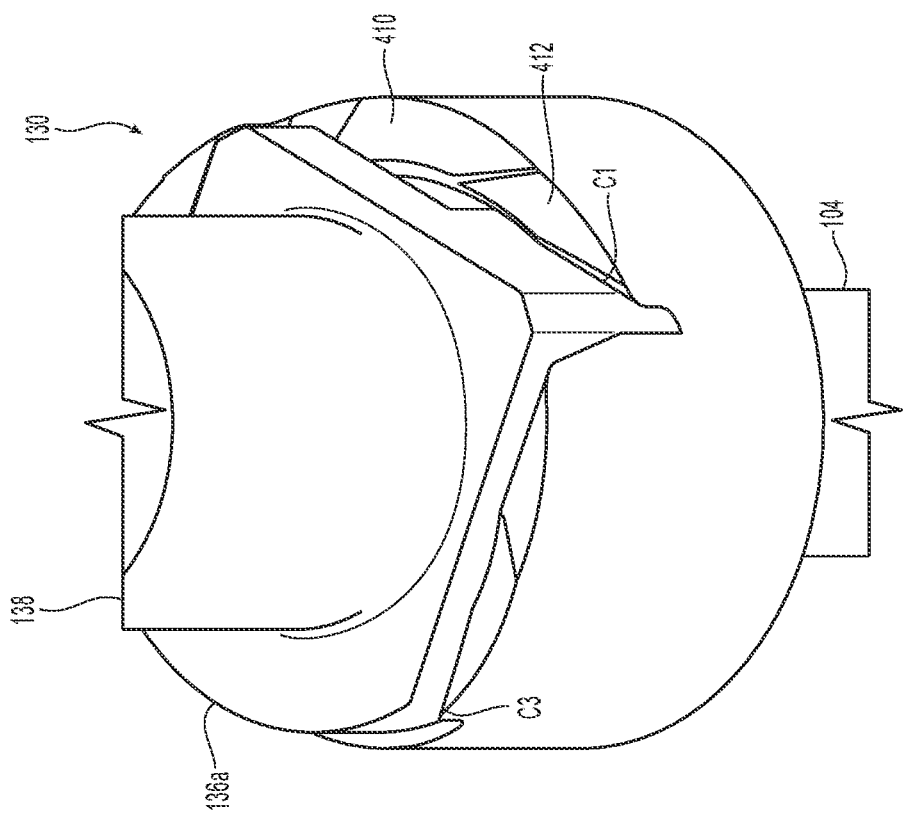
FIG. 31 is a first elevation view of the ferrule holder of FIG. 28 with the ferrule holder inserted therein.

The insertion of the fiber optic ferrule 104 is illustrated in FIGS. 30-31. In FIG. 30 the fiber optic ferrule 104 is ready to engage the ramps 400 and 402. As the flange 130 engages the ramps 400 and 402, the contacts C1-C4 will engage the various parts of the ramps 400, 402 as required and as noted above. The rotation of the fiber optic ferrule 104 in a clockwise direction will allow the flange 130 to position the fiber optic ferrule 104 in the final position. The flange 130 engages the wall 442 after coming over the step 420 and engaging the joining ramp surface 422. See FIG. 31.

Figure 32:
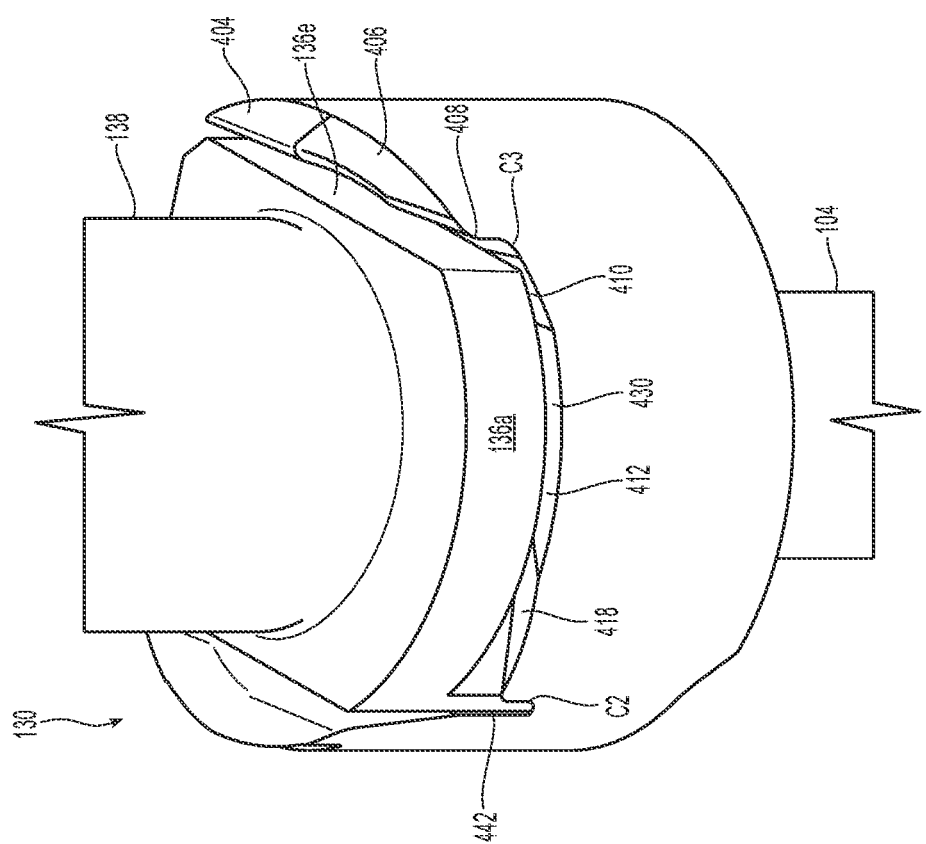
FIG. 32 is another elevation view of the ferrule holder of FIG. 28 with the ferrule holder inserted therein.
Figure 33:
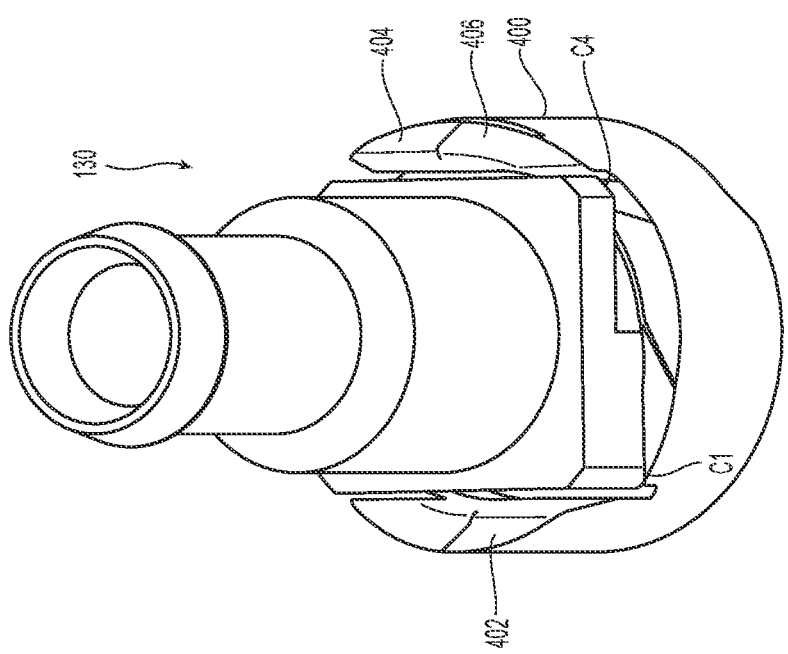
FIG. 33 is a rear perspective view of the ferrule holder of FIG. 28 with the ferrule holder inserted therein.

FIG. 32 illustrates the positions of the fiber optic ferrule and the seating features when the assembly is in a polishing jig (not shown but conventional). As seen in the front of the figure, there is a small opening or space 430 where the fiber optic ferrule has been pushed back in a longitudinal direction (or upwards in the figure) due to the engagement of the polishing jig with the fiber optic ferrule 104. The flange 130 has also moved by the wall 442 at C2 in the same direction. However, the flange 130 is still in engagement with the wall 442. The flange 130 cannot rotate relative to the ramps 400 and 402. As seen on the right side of the figure, the surface 136e (See FIG. 9) would engage the step 408 and the surfaces inside the surfaces 404 and 406 preventing the rotation of the flange 130, and also from rotating up the sloped surfaces 410, 418. Although not shown, a spring that would be engaging the flange 130 would also prevent too much movement of the fiber optic ferrule 104 in a rearward direction. Once the fiber optic ferrule 104 is removed from the polishing jig, the fiber optic ferrule would return to its final position, and the opening or space 430 would reduce or even close. FIG. 33 is another view of the fiber optic ferrule in FIG. 32 from the other side.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic connector comprising:
a connector housing having an opening defined by an inner connector housing wall, the opening extending along a longitudinal direction of the connector housing;
an opening wall at least partially surrounding the opening and extending into the opening from the inner connector housing wall;
a fiber optic ferrule disposable in the opening, the fiber optic ferrule having a flange extending around at least a portion thereof; and
at least one pair of ramps extending into the opening from the inner connector housing wall, each of the at least one pair of ramps connected to the opening wall via a respective ramp wall at the opening wall, the flange engaging each of the at least one pair of ramps in at least two places in a final position.

2. The fiber optic connector according to claim 1, wherein the final position comprises a position allowing the fiber optic ferrule to resiliently engage a second fiber optic ferrule in a second fiber optic connector.

3. The fiber optic connector according to claim 1, wherein the at least one pair of ramps comprises two ramps and the flange engages the two ramps in at least four places in the final position.

4. The fiber optic connector according to claim 1, wherein the engagement of the flange with the at least one pair of ramps causes the flange to rotate relative to the connector housing in only one direction.

5. The fiber optic connector according to claim 1, wherein the engagement of the flange with the at least one pair of ramps causes the flange to translate relative to the connector housing.

6. The fiber optic connector according to claim 1, wherein the final position is when a first portion of the flange contacts each ramp in the at least one pair of ramps and a second, different portion of the flange contacts each ramp in the at least one pair of ramps in a different position from the first portion.

7. The fiber optic connector of claim 1, wherein the at least one pair of ramps geometrically follow a helical curve.

8. The fiber optic connector according to claim 1, wherein the flange includes a ramp contact edge configured to slide along at least a portion of one of the at least one pair of ramps in a rotational motion of the fiber optic ferrule until the final position.

9. The fiber optic connector according to claim 1, wherein the fiber optic ferrule has an angled polished end-face.

10. The fiber optic connector according to claim 1, wherein in the final position, there is a gap between the flange and a junction of a ramp surface of the at least one pair of ramps and a non-uniform ramp wall of another of the ramps of the at least one pair of ramps.

11. A fiber optic connector comprising:
a connector housing having an opening defined by an inner connector housing wall, the opening extending along a longitudinal direction of the connector housing;
an opening wall at least partially surrounding the opening and extending into the opening from the inner connector housing wall;
a fiber optic ferrule disposable in the opening, the fiber optic ferrule having a flange extending around at least a portion thereof; and
at least one pair of ramps extending into the opening from the inner connector housing wall, each of the at least one pair of ramps having a ramp surface and a non-uniform ramp wall and engaging at least a portion of the inner connector housing wall, the flange engaging each of the at least one pair of ramps in at least two places in a final position.

12. The fiber optic connector according to claim 11, wherein the flange engages a junction of the ramp surface of one of the at least one pair of ramps and the non-uniform ramp wall of another of the at least one pair of ramps.

13. The fiber optic connector according to claim 11, further comprising: an additional fiber optic ferrule also disposable in the opening substantially parallel to the fiber optic ferrule, the additional fiber optic ferrule having a respective flange extending around at least a portion thereof.

14. The fiber optic ferrule according to claim 11, wherein in the final position the fiber optic ferrule has a maximum angular rotation about the longitudinal direction that is within 0.5°-1.5°.

15. A duplex fiber optic connector comprising:
a connector housing having a pair of openings each opening in the pair of openings defined by an inner connector housing wall, the opening extending along a longitudinal direction of the connector housing;
an opening wall at least partially surrounding the opening and extending into the opening from the inner connector housing wall;
a pair of fiber optic ferrules receivable inside the connector housing, wherein each fiber optic ferrule in the pair of fiber optic ferrules is disposable in a respective one of the openings, each of the fiber optic ferrules having a flange extending around at least a portion thereof and each of the fiber optic ferrules supporting an optical fiber; and
at least one pair of ramps extending into each of the openings from the inner connector housing wall, each of the at least one pair of ramps having a ramp surface and a non-uniform wall and engaging at least a portion of the inner connector housing wall, the flange engaging each of the at least one pair of ramps in a final position,
wherein in the final position of the pair of fiber optic ferrules, an endface of one of the pair of fiber optic ferrules is facing in a direction different from an endface of the other one of the pair of fiber optic ferrules.

16. The duplex fiber optic connector according to claim 15, wherein the optical fiber has a single core or has multiple cores.

17. The duplex fiber optic connector according to claim 16, wherein in the final position each of the fiber optic ferrules has a maximum angular rotation about the longitudinal direction that is within 0.5°-1.5°.

18. The duplex fiber optic connector according to claim 15, wherein in the final position each of the fiber optic ferrules has a maximum angular rotation about the longitudinal direction that is within 0.5°-1.5°.

* * * * *